United States Patent
Lachowsky

(10) Patent No.: US 10,049,427 B1
(45) Date of Patent: Aug. 14, 2018

(54) IMAGE DATA HIGH THROUGHPUT PREDICTIVE COMPRESSION SYSTEMS AND METHODS

(71) Applicant: Apple Inc., Cupertino, CA (US)

(72) Inventor: Stephan Lachowsky, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/677,254

(22) Filed: Aug. 15, 2017

(51) Int. Cl.
*G06T 1/20* (2006.01)
*G06T 1/60* (2006.01)

(52) U.S. Cl.
CPC .................. *G06T 1/20* (2013.01); *G06T 1/60* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 9,635,386 B2 * | 4/2017 | Hendry | H04N 19/70 |
| 2010/0098155 A1 * | 4/2010 | Demircin | H03M 7/4006 |
| | | | 375/240.02 |
| 2014/0146794 A1 * | 5/2014 | Dalsgaard | H04W 8/02 |
| | | | 370/332 |
| 2016/0142740 A1 * | 5/2016 | Sharman | H04N 19/91 |
| | | | 375/240.12 |
| 2017/0127058 A1 * | 5/2017 | Misra | H04N 19/105 |

* cited by examiner

*Primary Examiner* — Xin Sheng
(74) *Attorney, Agent, or Firm* — Fletcher Yoder PC

(57) ABSTRACT

Systems and methods for improving operation of an electronic device that includes a processing pipeline. The processing pipeline includes a prediction block that determines prediction residuals based on difference between uncompressed image data corresponding with a pixel tile and prediction of a first pixel group in the pixel tile and difference between the uncompressed image data and prediction of a second pixel group in the pixel tile, a run encode block that replaces a first of the prediction residuals with an escape value and a second of the prediction residuals with a run length value when a run starting in the first pixel group and continuing into the second pixel group is detected, and an entropy encode block that generates compressed image data corresponding with the pixel tile by entropy encoding a third of the prediction residuals, the escape value, and the run length value when the run is detected.

20 Claims, 13 Drawing Sheets

IMAGE DATA HIGH THROUGHPUT PREDICTIVE COMPRESSION SYSTEMS AND METHODS

BACKGROUND

The present disclosure relates generally to image data processing and, more particularly, to predictive compression and decompression of image data.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

To present visual representations of information, an electronic device may utilize an electronic display to display one or more images (e.g., pictures or image frames) based on corresponding image data. In particular, the electronic display may adjust luminance of its display pixels based on target luminance indicated by the image data. In some instances, image data may be processed before being using to display a corresponding image, for example, to facilitate improving perceived image quality.

To facilitate processing, in some instances, image data may be stored in memory. For example, image data may be read (e.g., retrieved) from memory and processed to determine processed image data. The processed image data may then be written (e.g., stored) to memory to enable subsequent retrieval, for example, for further processing and/or display of a corresponding image. As such, size of image data may affect resources (e.g., communication bandwidth and/or storage space) used to communicate and/or store image data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to image data processing by an electronic device, for example, before image data is used to display a corresponding image on an electronic display. To facilitate processing image data, the electronic device may include one or more processing pipelines. Additionally, the electronic device may include a memory device that stores image data, for example, to facilitate communication between processing pipelines by reading (e.g., retrieving) image data from the memory device and/or writing (e.g., storing) image data to the memory device via one or more a direct memory access (DMA) channels. As such, size (e.g., number of bits) of image data may affect implementation associated cost of the electronic device, such as communication bandwidth implemented on a direct memory access channel and/or storage space implemented in the memory device.

To facilitate reducing implementation associated cost of an electronic device that processes image data, the present disclosure provides techniques that enable losslessly compressing and/or decompressing image data, which, at least in some instances, may facilitate improving communication efficiency and/or storage efficiency in the electronic device. In some embodiments, a processing pipeline in the electronic device may include a compression engine that compresses image data (e.g., before storage in the memory device) and/or a decompression engine (e.g., circuitry) that decompresses compressed image data (e.g., before processing by one or more processing blocks in the processing pipeline). Additionally, in some embodiments, the compression engine and/or the decompression engine may be implemented by circuitry in a direct memory access (DMA) block of the processing pipeline.

To facilitate subsequent (e.g., random or semi-random) retrieval, in some embodiments, an image may be divided into pixel tiles (e.g., 16×8 image pixels) each compressed and/or decompressed as a unit. Additionally, to facilitate providing a fixed input rate, a prediction of one pixel group (e.g., 4×1 image pixels) in a pixel tile used for image data compression and/or decompression may be predicted per clock cycle. In other words, the compression engine and/or the decompression engine may predict N (e.g., 4) image pixels at a time (e.g., substantially in parallel). Moreover, in some embodiments, the prediction of a pixel group may be determined based on neighboring image data relatively independent of image data in the pixel group.

Generally, based on the prediction of each pixel group in a pixel tile, the compression engine may determine sets of prediction residuals each corresponding to one pixel group. In particular, a set of prediction residuals corresponding with a pixel group may include one prediction residual per image pixel indicative of difference between the image data and a corresponding portion of the prediction. In some embodiments, the compression engine may determine the prediction residuals in a signed-magnitude notation, for example, by multiplying absolute value of by two and adding value of a sign bit (e.g., zero or one) to convert from a 2's complement notation.

To facilitate improving compression efficiency, the compression engine may attempt to run encode the prediction residuals. In particular, the compression engine may determine whether a run of prediction values each with the same value is present and, when a run spanning multiple pixel groups is detected, collapsing indication of corresponding prediction residuals. For example, when a run starting in a current pixel group and continuing though one or more subsequent pixel groups is detected, parameters (e.g., starting location and/or length) of the run may be indicated by replacing one or more prediction residuals of the current pixel group with an escape value (e.g., code) and/or a run length value.

To generate compressed image data corresponding with a pixel group, the compression engine may entropy encode remaining values (e.g., prediction residuals, an escape value, and/or a run length value). In some embodiments, the compressed image data may include a fixed length portion (e.g., code) and a variable length portion (e.g., code) that losslessly indicates each value, for example, truncated and concatenated together. To facilitate identifying each value, the fixed length portion (e.g., code) may indicate number of bits in the variable length portion used to indicate each value. To facilitate further improving compression efficiency, in some embodiments, the compression engine may generate the variable length portion by truncating and/or concatenating the remaining value, for example, based on based on most significant non-zero bit used to indicate each value in binary and/or scan order in each pixel group.

After processing each pixel group in a pixel tile, the processing pipeline may determine and store compressed image data corresponding with the pixel tile in the memory device. Since size of compressed image data corresponding with different pixel tiles may vary, the processing pipeline may store one or more size parameters indicative of number of bits in corresponding compressed image data. To facilitate subsequent retrieval, in some embodiments, the processing pipeline may store compressed image data and/or a corresponding size parameter at memory address in the memory device based at least in part on frame coordinates of the pixel tile.

As such, to retrieve compressed image data for a target pixel tile, a processing pipeline may read memory addresses in the external memory device based at least in part on its frame coordinates and/or a corresponding size parameter. Since size of compressed image data may vary and communication bandwidth is generally fixed, at least in some instances, retrieving compressed image data corresponding with the target pixel tile may also return compressed image data corresponding with a different pixel tile. To reducing data retrieved when the different pixel tile is subsequently targeted, in some embodiment, the processing pipeline may store image data (e.g., compressed image data and/or uncompressed image data) corresponding to the different pixel tile in internal memory.

When a downstream image data processing blocks (e.g., circuitry) is implemented to operate on uncompressed image data, the decompression engine may decompress compressed image data corresponding with the target pixel before subsequent processing. To facilitate providing lossless decompression, in some embodiments, the decompression engine may generally perform reverse operations in a reverse order relative to a compression engine. In other words, in such embodiments, the decompression engine may entropy decode compressed image data corresponding with the target pixel tile, run decode entropy decoded values to determine prediction residuals corresponding to each pixel group in the target pixel tile, and reconstruct each pixel group by applying the prediction residuals to a prediction of a corresponding pixel group to determine uncompressed image data.

In this manner, the present disclosure provides techniques that enable losslessly compressing image data with a fixed input rate and/or losslessly decompressing image data with a fixed output rate. In other words, implementing the present disclosed techniques may facilitate reducing size of image data communicated with and/or stored in the memory device. As such, communication efficiency and/or storage efficiency in an electronic device that processes image data may be improved, which, at least in some instances, may facilitate reducing implementation associated cost, for example, by enabling a communication bus to be implemented with a smaller communication bandwidth and/or external memory to be implemented with smaller storage capacity.

BRIEF DESCRIPTION OF THE DRAWINGS

Various aspects of this disclosure may be better understood upon reading the following detailed description and upon reference to the drawings in which.

DETAILED DESCRIPTION

Figure 1:
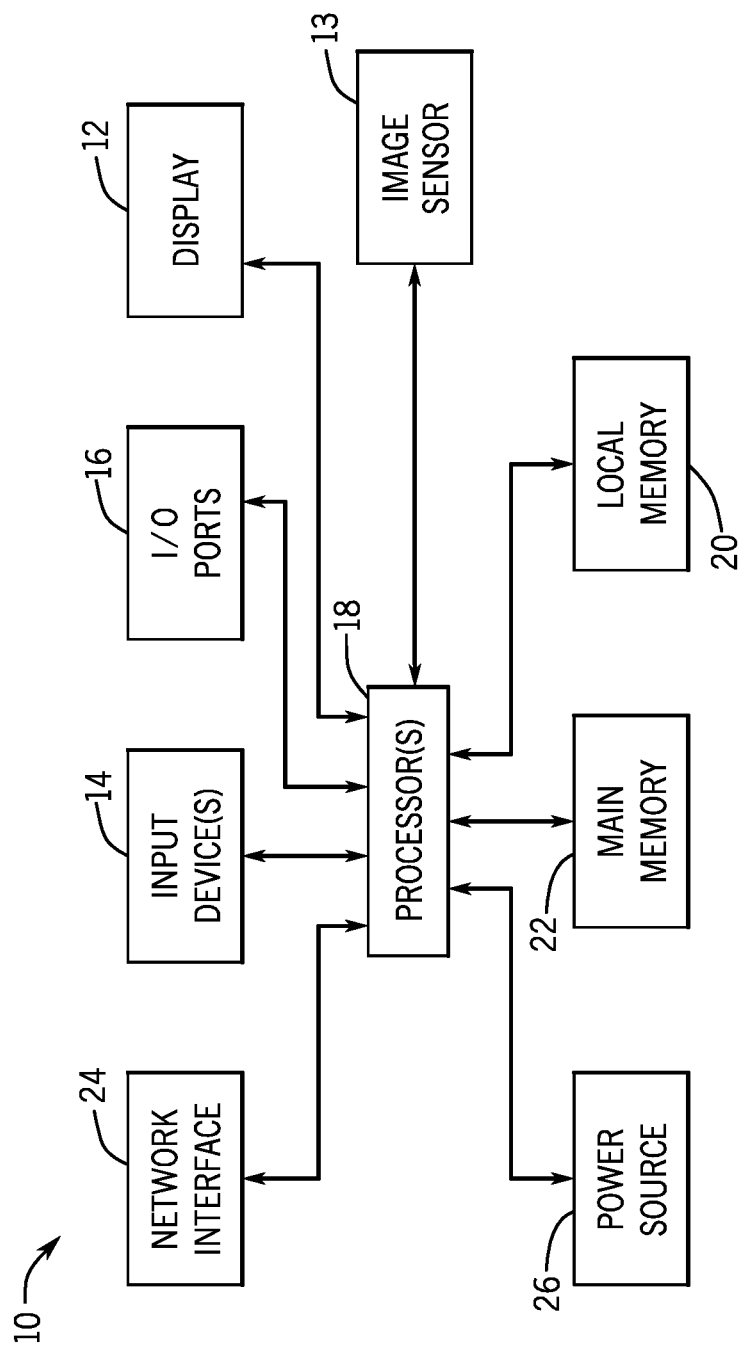
FIG. 1 is a block diagram of an electronic device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to image data processing, for example, before the image data is used to display a corresponding image (e.g., picture or image frame) on an electronic display. In some instances, an electronic device may include one or more processing pipelines implemented (e.g., designed) to process image data. To facilitate communication between processing pipelines, image data may be stored in memory, for example, external from the processing pipelines. In such instances, a processing pipeline may include a direct memory access (DMA) block that reads (e.g., retrieves) image data from memory and/or writes (e.g., stores) image data to memory.

As such, size (e.g., number of bits) of image data may affect implementation associated cost of the electronic device. For example, size of image data may affect communication bandwidth implemented on a communication bus (e.g., DMA channel) between external memory and a processing pipeline. Additionally, size of image data may affect storage space implemented in external memory.

The present disclosure provides techniques to facilitate reducing implementation associated cost of an electronic device that processes image data, for example, by losslessly compressing and/or decompressing image data to facilitate improving communication efficiency and/or storage efficiency. In some embodiments, a processing pipeline in the electronic device may include a compression engine (e.g., circuitry) that compresses image data before storage in external memory. To facilitate subsequent (e.g., random or semi-random) retrieval of image data corresponding with a portion of an image, in some embodiments, the compression engine may compress image data corresponding with a pixel tile (e.g., 16×8 image pixels) in an image as a unit.

Moreover, to facilitate providing a fixed input rate, the compression engine may predict image data corresponding with one pixel group (e.g., 4×1 image pixels) in the pixel tile per clock cycle. In other words, the compression engine may predict N (e.g., 4) image pixels at a time (e.g., substantially in parallel). For example, the compression engine may determine a prediction of a pixel group based on neighboring uncompressed image data. To facilitate predicting one pixel group per clock cycle, in some embodiments, the compression engine may determine the prediction of a pixel group relatively independent of image data corresponding with the pixel group with the understanding that neighboring image data may be indicative of the pixel group. In other words, in such embodiments, the prediction of a pixel group may be determined without directly processing corresponding image data.

Based at least in part a prediction of a pixel group, the compression engine may determine a prediction residual for each image pixel in the pixel group to indicate a difference between the prediction and uncompressed image data of the pixel group. In some embodiments, the compression engine may determine prediction residuals in a 2's complement notation. To facilitate subsequent processing, in some embodiments, the compression engine may convert the prediction residuals into a signed-magnitude notation, for example, by multiplying absolute value of a prediction residual by two and adding value of a sign bit (e.g., zero or one) in the 2's complement notation.

Generally, the compression engine may run encode corresponding prediction residuals in an effort to detect and collapse runs (e.g., consecutive prediction residuals with the same value) spanning multiple pixel group in a pixel tile. Thus, to run encode, the compression engine may determine whether a run of prediction residuals starts in a current pixel group. For example, the compression engine may determine that a zero run (e.g., consecutive values of zero) starts in the current pixel group when prediction residuals corresponding with the last two image pixels in the current pixel group are both zero. When the start of a run is detected, the compression engine may determine whether the run continues into one or more subsequent pixel groups in the pixel tile. For example, the compression engine may determine that the zero run continues through a next subsequent pixel group when each prediction residual in the next subsequent pixel group is zero.

When a run continues into one or more subsequent pixel groups, the compression engine may replace the prediction residual at a starting pixel position with an escape value (e.g., code) to indicate occurrence of the run. For example, the compression engine may replace the prediction residual corresponding with a second to last image pixel in the current pixel group with an escape value of negative zero (−0), which converted to the signed-magnitude notation is one. Additionally, the compression engine may replace the prediction residual at a following pixel position a run length value (e.g., code) to indicate number of image pixels through which the run continues. For example, when the zero run continues through two subsequent pixel groups, the compression engine may replace the prediction residual corresponding with the last image pixel in the current group with a run length value of positive two, which converted to the signed-magnitude notation is four.

In other words, an escape value may indicate a starting pixel position of a run collapsed by the compression engine. Additionally, a run length value may indicate the number of pixel positions through which the run collapsed by the compression engine continues. In this manner, when a run of prediction residuals starts in the current pixel group and continues into a subsequent pixel group, prediction residuals corresponding with the subsequent pixel group may be indicated with the current pixel group, thereby reducing number of bits used to indicate the prediction residuals and, thus, improving compression efficiency.

To facilitate further improving compression efficiency, the compression engine may entropy encode remaining values (e.g., prediction residuals, an escape value, and/or a run length value) corresponding with the current pixel group to generate compressed image data. In some embodiments, the compressed image data may include a fixed length portion (e.g., code) and a variable length portion (e.g., code). To determine the variable length code, the compression engine may, for example, truncate and/or concatenate the remaining values. In particular, to facilitate providing lossless compression, the compression engine may determine number of bits sufficient to indicate each remaining value (e.g., by determining highest most significant non-zero bit used to indicate in binary) and truncate accordingly. To facilitate subsequent decompression, the compression engine may indicate number of bits from the variable length code intended to be interpreted together to indicate each value via the fixed length code.

After processing each pixel group in a pixel tile, a direct memory access (DMA) block in the processing pipeline may store compressed image data corresponding with the pixel tile in external memory. At least in some instances, size of compressed image data corresponding with different pixel tiles may vary due at least in part to the variable length portion of compressed image data. Thus, to facilitate subsequent retrieval of compressed image data corresponding with a pixel tile, the direct memory access block may store the compressed image data along with a size parameter that indicates size of the compressed image data, for example, based at least in part on location (e.g., frame coordinates) of the pixel tile in a corresponding image.

As such, to retrieve compressed image data for a target pixel tile, a processing pipeline may read a corresponding size parameter based at least in part on location of the target pixel tile and retrieve data at memory addresses determined based at least in part on the size parameter, for example, via a DMA block. In some embodiments, communication bandwidth between external memory and a processing pipeline may be substantially fixed, thereby resulting in each read from external memory returning a fixed number of bits. When size of compressed image data corresponding with the target pixel tile differs from the communication bandwidth, at least in some instances, retrieving compressed image data corresponding with the target pixel tile may result in compressed image data corresponding with another pixel tile also being retrieved. In some embodiments, image data corresponding with a pixel tile other than the target pixel tile may be stored in internal memory of the processing pipeline, for example, to facilitate improving communication efficiency by reducing amount of data retrieved from external memory when the other pixel tile is subsequently targeted.

In some embodiments, a processing pipeline in the electronic device may include a decompression engine (e.g., circuitry) that decompresses compressed image data, for example, before processing by one or more processing blocks in the processing pipeline. To facilitate providing lossless decompression, the decompression engine may generally perform reverse operations in a reverse order relative to a compression engine. In other words, the decompression engine may entropy decode compressed image data corresponding with a target pixel tile, run decode entropy decoded values to determine prediction residuals corresponding to each pixel group in the target pixel tile, and reconstruct each pixel group by applying the prediction residuals to a prediction of a corresponding pixel group.

To entropy decode compressed image data, the decompression engine may read one or more fixed length codes from compressed image data corresponding with the target pixel tile. Since variable length code corresponding with a pixel group generally includes a fixed number of values and fixed length code generally includes a fixed number of bits, the decompression engine may determine compressed image data corresponding with a pixel group in the target tile based at least in part on the one or more fixed length codes, for example, by traversing each fixed length code based on the predetermined fixed number of bits and traversing each variable length code based on number of values expected be to indicated and/or number of bits used to indicate each value as indicated by a corresponding fixed length code. Moreover, based on a fixed length code, the decompression engine may determine values from corresponding variable length code associated with each image pixel in the pixel group, for example, by traversing the variable length code based on number of bits intended to be interpreted together to indicate a value.

After entropy decoding, the decompression engine may run decode the values to determine prediction residuals (e.g., in signed-magnitude notation) corresponding with a current pixel group as well as prediction residuals corresponding with subsequent pixel groups into which a run starting in the current pixel group continues. As described above, the starting pixel position of a run may be indicated via an escape value (e.g., negative zero or one in signed-magnitude notation) and length of the run may be indicated via a run length value. Thus, to run decode, the decompression engine may determine whether the escape value is present and, when present, insert a run accordingly. For example, when the escape value is detected and the corresponding run length value is two, the decompression engine may determine that each prediction residual in the next two pixel groups is zero. Moreover, since prediction residuals corresponding with a pixel group in which a run starts are replaced to indicate parameters (e.g., start and/or length) of the run, the decompression engine may determine one or more prediction residuals in the current pixel group based on expected value of the run. For example, when a zero run is detected, the decompression engine may determine that the prediction residual corresponding with the second to last image pixel in the current pixel group and the prediction residual corresponding with the last image pixel in the current pixel group are both equal to zero.

Based at least in part on corresponding prediction residuals, the decompression engine reconstruct a pixel group to determine corresponding uncompressed image data. For example, in a similar manner as the compression engine, the decompression engine may determine a prediction of a current pixel group based on neighboring uncompressed image data. Additionally, to determine decompressed image data, the decompression engine may apply the prediction residuals to the prediction of the pixel group. For example, when the prediction residual is an odd value in the signed-magnitude notation, the decompression engine may determine magnitude of the prediction residual (e.g., by subtracting one and dividing by two) and subtract the magnitude from the prediction. On the other hand, when the prediction residual is not an odd value in the signed-magnitude notation, the decompression engine may determine magnitude of the prediction residual (e.g., by dividing by two) and add the magnitude to the prediction.

Thus, as will be described in more detail below, the present disclosure provides techniques that enable a processing pipeline to losslessly compress image data with a fixed input rate (e.g., before output to external memory) and/or to losslessly decompress image data with a fixed output rate (e.g., before subsequent processing via one or more processing blocks). In other words, the presently disclosed techniques may facilitate reducing size of image data communicated with and/or stored in external memory. By reducing size of image data, communication efficiency and/or storage efficiency may be improved, which, at least in some instances, may facilitate reducing implementation associated cost of an electronic device that processes image data, for example, by enabling a communication bus to be implemented with a smaller communication bandwidth and/or external memory to be implemented with smaller storage capacity.

To help illustrate, an electronic device 10, which may utilize an electronic display 12 to display images based on image data and/or an image sensor 13 to capture image data, is shown in FIG. 1. As will be described in more detail below, the electronic device 10 may be any suitable computing device, such as a handheld computing device, a tablet computing device, a notebook computer, and/or the like. Thus, it should be noted that FIG. 1 is merely one example of a particular implementation and is intended to illustrate the types of components that may be present in the electronic device 10.

In the depicted embodiment, the electronic device 10 includes the electronic display 12, the image sensor 13, one or more input devices 14, one or more input/output (I/O) ports 16, a processor core complex 18 having one or more processors or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

As depicted, the processor core complex 18 is operably coupled with local memory 20 and the main memory storage device 22. In some embodiments, the local memory 20 and/or the main memory storage device 22 may be tangible, non-transitory, computer-readable media that stores instructions executable by the processor core complex 18 and/or data to be processed by the processor core complex 18. For example, the local memory 20 may include random access memory (RAM) and the main memory storage device 22 may include read only memory (ROM), rewritable nonvolatile memory such as flash memory, hard drives, optical discs, and/or the like.

In some embodiments, the processor core complex 18 may execute instruction stored in local memory 20 and/or the main memory storage device 22 to perform operations, such as encoding image data captured by the image sensor 13 and/or decoding image data for display on the electronic display 12. As such, the processor core complex 18 may include one or more general purpose microprocessors, one or more application specific processors (ASICs), one or more field programmable logic arrays (FPGAs), or any combination thereof.

Additionally, as depicted, the processor core complex 18 is operably coupled with the network interface 24. Using the network interface 24, the electronic device 10 may communicatively couple to a communication network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network for display on the electronic display 12.

Furthermore, as depicted, the processor core complex 18 is operably coupled with I/O ports 16, which may enable the electronic device 10 to interface with various other electronic devices. For example, a portable storage device may be connected to an I/O port 16, thereby enabling the processor core complex 18 to communicate data with a portable storage device. In this manner, the I/O ports 16 may enable the electronic device 10 to output image data to the portable storage device and/or receive image data from the portable storage device.

As depicted, the processor core complex 18 is also operably coupled to the power source 26, which may provide power to the various components in the electronic device 10. The power source 26 may include any suitable source of energy, such as a rechargeable lithium polymer (Li-poly) battery and/or an alternating current (AC) power converter. Furthermore, as depicted, the processor core complex 18 is operably coupled with input devices 14, which may enable a user to interact with the electronic device 10. In some embodiments, the inputs devices 14 may include buttons, keyboards, mice, trackpads, and the like. Additionally or alternatively, the electronic display 12 may include touch components that enable user inputs to the electronic device 10 by detecting occurrence and/or position of an object touching its screen (e.g., surface of the electronic display 12).

In addition to enabling user inputs, the electronic display 12 may present visual representations of information by display images, such as a graphical user interface (GUI) of an operating system, an application interface, a still image, or video content. As described above, the electronic display 12 may display the images based on image data. In some embodiments, the image data may be received from another electronic device 10, for example, via the network interface 24 and/or the I/O ports 16. Additionally or alternatively, the image data may be generated by electronic device 10 using the image sensor 13. In some embodiments, image sensor 13 may digitally capture visual representations of proximate physical features as image data.

Figure 2:
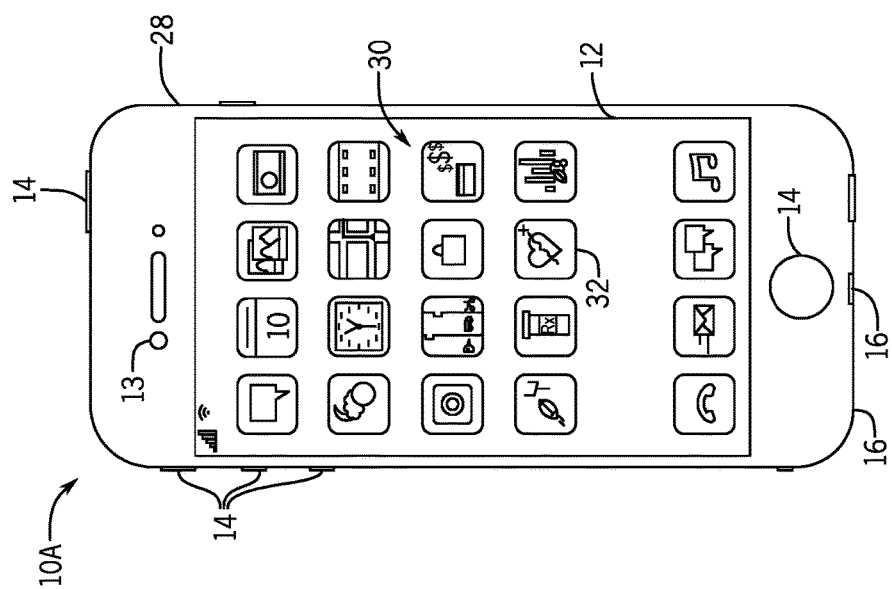
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
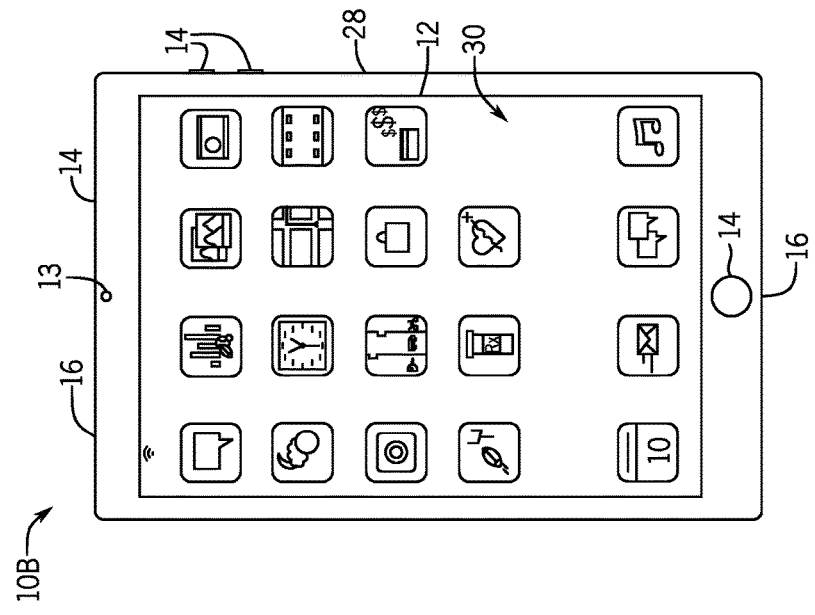
FIG. 3 is another example of the electronic device of FIG. 1, in accordance with an embodiment.
Figure 4:
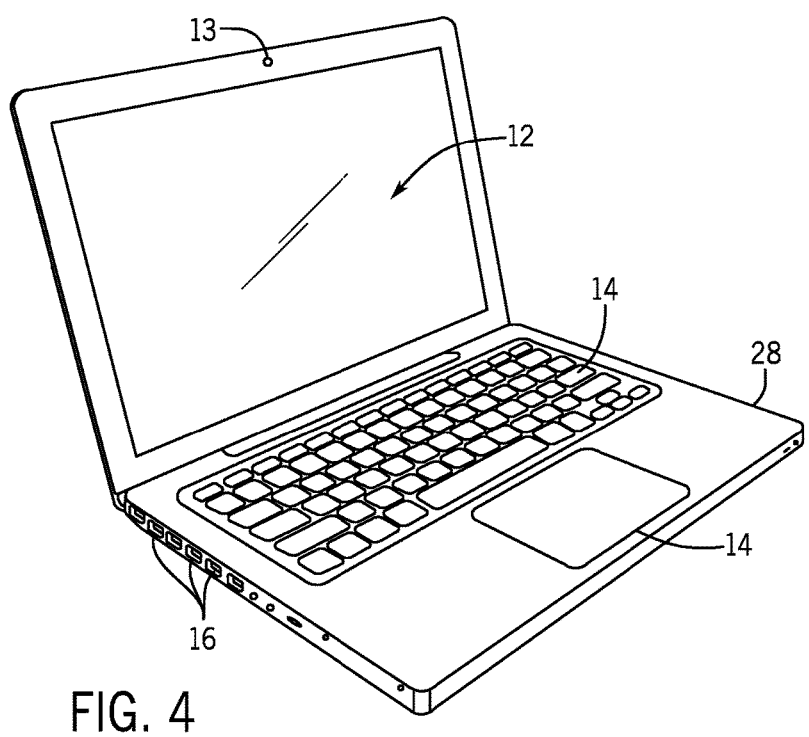
FIG. 4 is another example of the electronic device of FIG. 1, in accordance with an embodiment.
Figure 5:
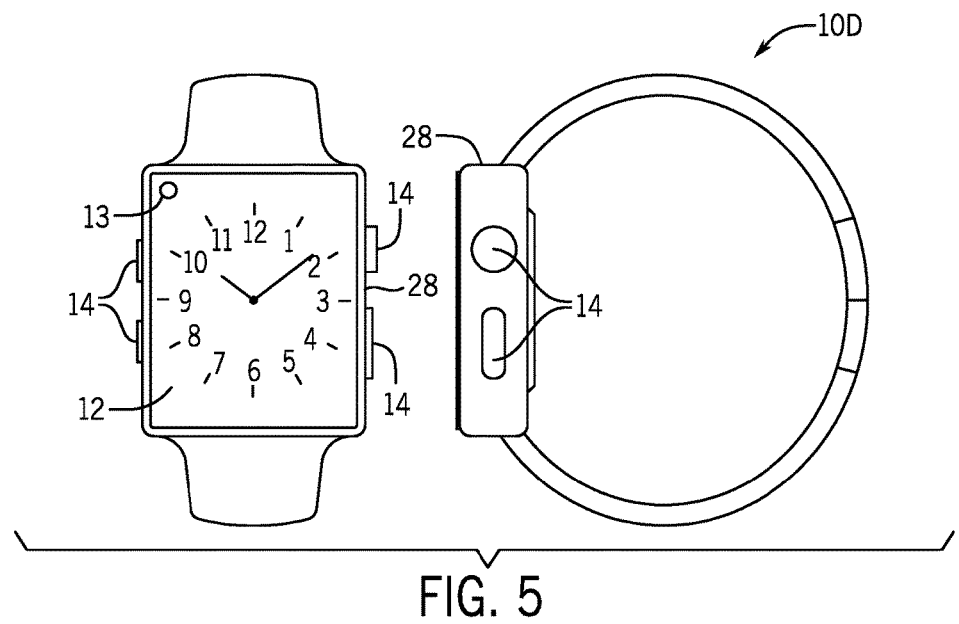
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, the electronic display 12 may display images based at least in part on image data, for example, received from the local memory 20 and/or the main memory storage device 22. Additionally, as described above, image data may be processed before being used to display a corresponding image on the electronic display 12, for example, to facilitate improving perceived image quality. In some embodiments, image data may be processed via one or more processing pipelines implemented in the electronic device 10.

Figure 6:
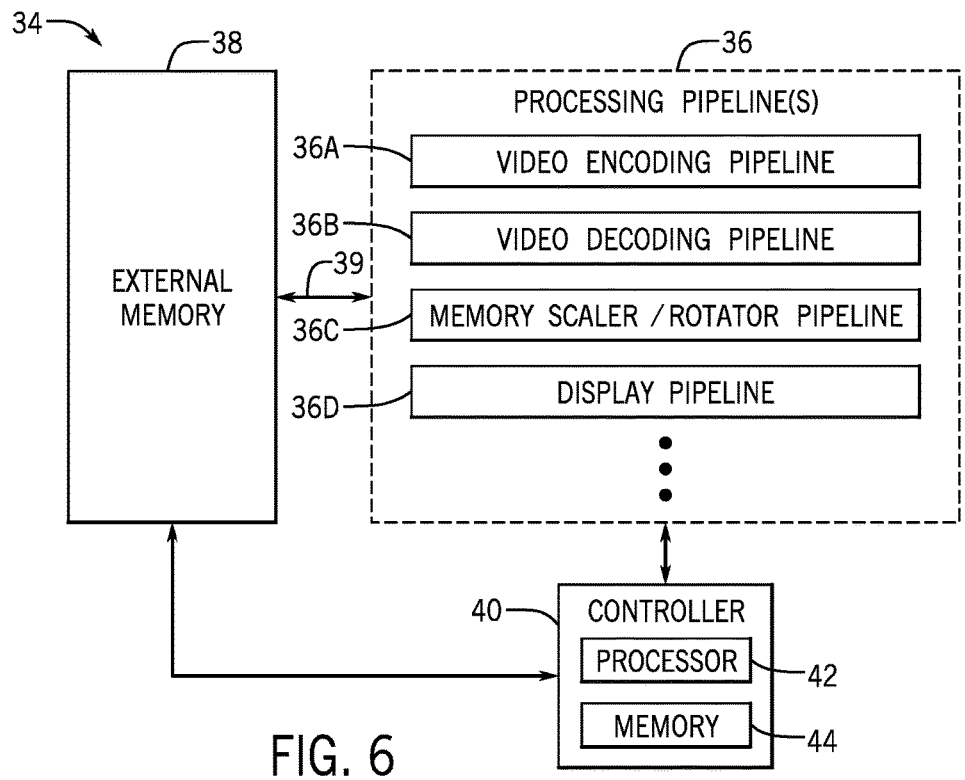
FIG. 6 is a block diagram of a portion of the electronic device of FIG. 1 including one or more image data processing pipelines and external memory, in accordance with an embodiment.

To help illustrate, a portion 34 of the electronic device 10 including multiple processing pipelines 36 (e.g., image data processing pipelines) is shown in FIG. 6. By way of example, processing pipelines 36 implemented in an electronic device 10 may include a video encoding pipeline 36A, a video decoding pipeline 36B, a memory scaler/rotator pipeline 36C, a display pipeline 36D, or any combination thereof. One or more of the processing pipelines 36 may be implemented by circuitry in the electronic device 10, circuitry in the electronic display 12, or a combination thereof. For example, a processing pipeline 36 may be implemented at least in part in the processor core complex 18, the image processing circuitry 27, a timing controller (TCON) in the electronic display 12, or any combination thereof.

The portion 34 of the electronic device 10 may also include external memory 38 (e.g., memory device) and a controller 40. In some embodiments, the controller 40 may control operation of one or more of the processing pipelines 36 and/or the external memory 38. For example, the controller 40 may be a direct memory access (DMA) controller that coordinates access to external memory 38 by the processing pipelines based on indications (e.g., signals) that data is to be stored in external memory 38 and/or indications that data is to be retrieved from external memory 38.

To facilitate controlling operation, the controller 40 may include a controller processor 42 and controller memory 44. In some embodiments, the controller processor 42 may execute instructions stored in the controller memory 44. Thus, in some embodiments, the controller processor 42 may be included in the processor core complex 18, the image processing circuitry 27, a timing controller in the electronic display 12, a separate processing module, or any combination thereof. Additionally, in some embodiments, the controller memory 44 may be included in local memory 20, the main memory storage device 22, external memory 38, internal memory of a processing pipeline 36, a separate tangible, non-transitory, computer readable medium, or any combination thereof. Although depicted as a single controller 40, in some embodiments, one or more separate controllers 40 may be implemented to control operation of the processing pipelines 36.

Additionally, the processing pipelines 36 may be communicatively coupled to the external memory 38 via one or more communication busses 39 (e.g., DMA channels). In some embodiments, the external memory 38 may store image data, for example, to facilitate communication between processing pipelines 36. Thus, in some embodiments, the external memory may be included in local memory 20, the main memory storage device 22, a separate tangible, non-transitory, computer readable medium, or any combination thereof. As described above, a processing pipeline 36 may retrieve (e.g., read) image data from the external memory 38 and/or store (e.g., write) image data to the external memory.

Figure 7:
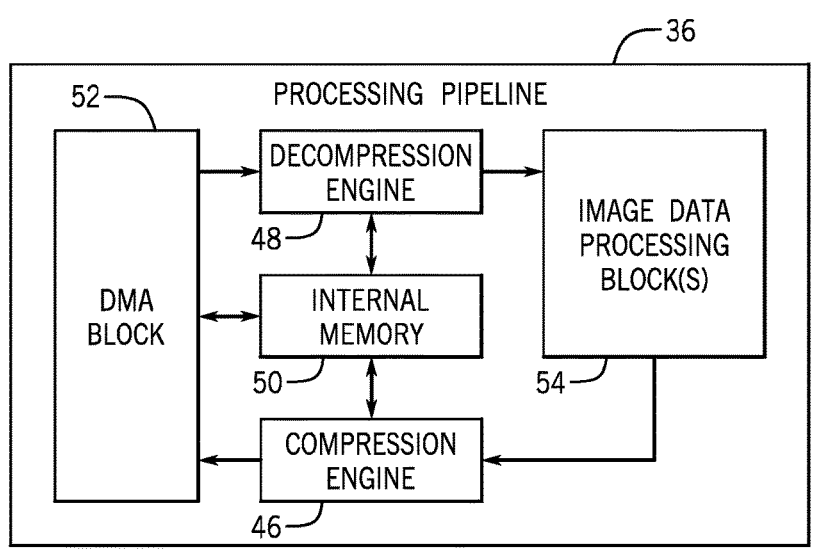
FIG. 7 is block diagram of an image data processing pipeline of FIG. 6, in accordance with an embodiment.

To help illustrate, a more detailed view of a processing pipeline 36 is shown in FIG. 7. As depicted, the processing pipeline 36 includes a compression engine 46, a decompression engine 48, internal memory 50, a direct memory access (DMA) block 52, and one or more image data processing blocks 54. Although depicted separately, in some embodiments, the compression engine 46 and/or decompression engine 48 may be implemented in the direct memory access block 52. Additionally, by way of example, the image data processing blocks 54 may include an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a dithering block, a sub-pixel uniformity compensation (SPUC) block, a content frame dependent duration (CDFD) block, an ambient light sensing (ALS) block, or any combination thereof when the processing pipeline 36 is a display pipeline 36D.

Generally, the direct memory access block 52 may provide the processing pipeline 36 access to the external memory 38. For example, the direct memory access block 52 may retrieve (e.g., read) image data from external memory 38 for processing by the image data processing blocks 54. Additionally or alternatively, the direct memory access block 52 may store (e.g., write) processed image data determined by the image data processing blocks 54 to external memory 38.

Generally, image data processing blocks 54 may be implemented (e.g., designed) to operate on uncompressed image data. However, size (e.g., number of bits) of data stored in external memory 38 and/or communicated between a processing pipeline 36 and external memory 38 may affect implementation associated cost of an electronic device 10, such as communication bandwidth implemented on a communication bus 39 and/or storage capacity implemented in external memory 38. Thus, to facilitate reducing implementation associated cost while enabling the image data processing blocks 54 to operate on uncompressed image data, the compression engine 46 may compress processed image data before storage in external memory 38.

Figure 8:
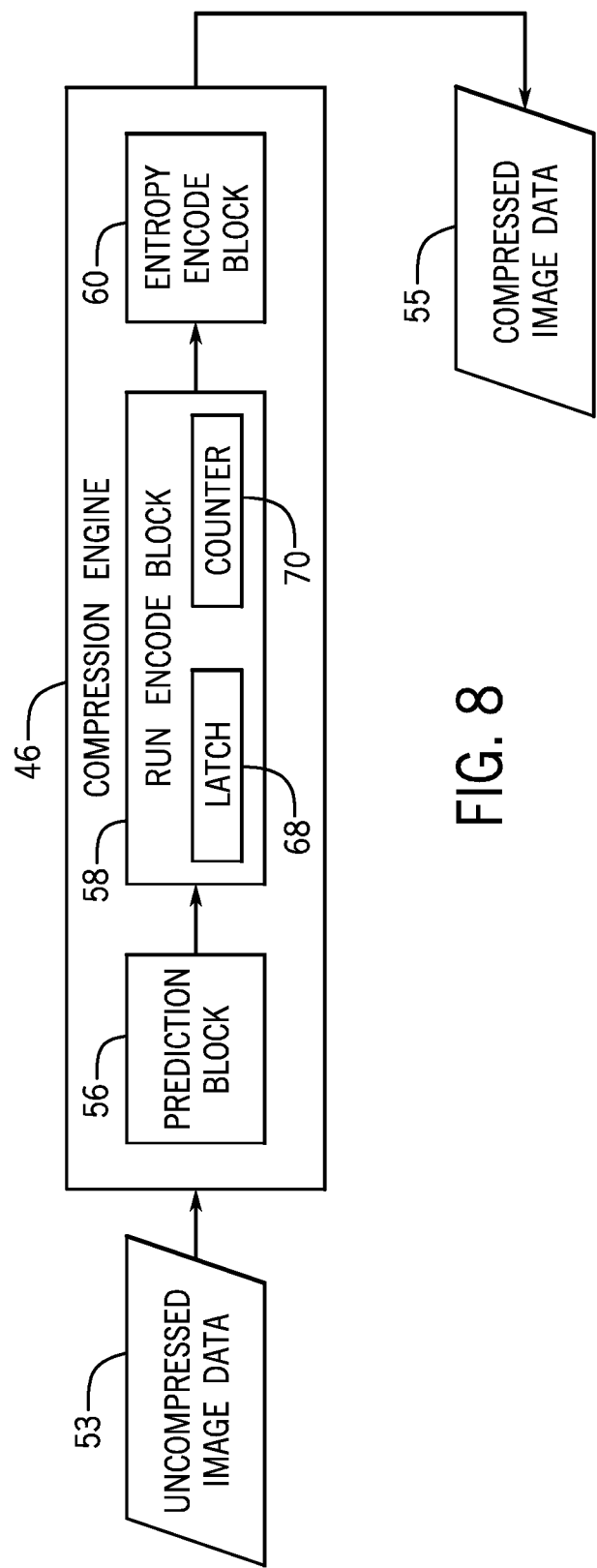
FIG. 8 is a block diagram of a compression engine in the image data processing pipeline of FIG. 7, in accordance with an embodiment.

To help illustrate, an example of a compression engine 46 is shown in FIG. 8. In operation, the compression engine 46 may receive uncompressed image data 53 and generate compressed image data 55. In some embodiments, the uncompressed image data 53 may be received from an image data processing block 54, the image sensor 13, and/or any other electronic device that suitably generates or outputs uncompressed image data 53. Additionally, in some embodiments, the compressed image data 55 may be communicated and stored in external memory 38 and/or any other electronic device that suitably stores compressed image data 55.

As described above, the compression engine 46 may process uncompressed image data 53 to generate corresponding compressed image data 55. To simplify discussion, the functions (e.g., operations) performed by the compression engine 46 are divided between various processing blocks (e.g., circuitry or modules). For example, in the depicted embodiment, the compression engine 46 includes a prediction block 56, a run encode block 58, and an entropy encode block 60.

Figure 9:
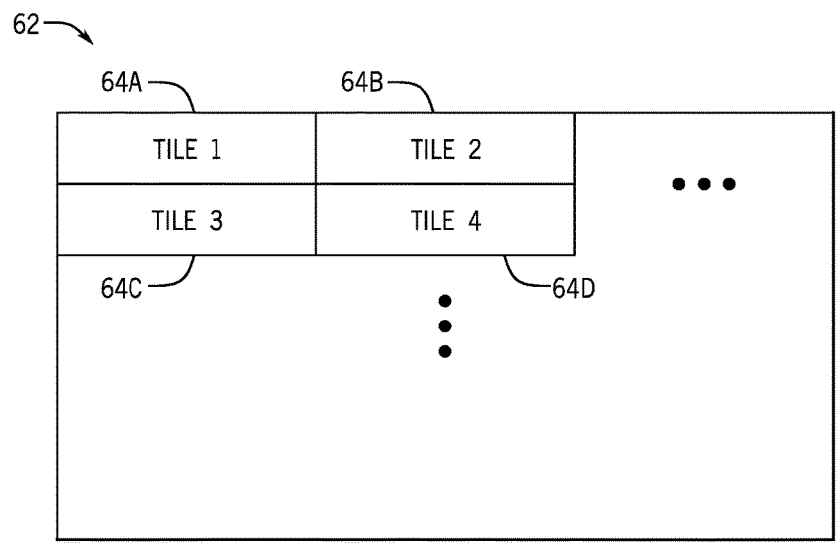
FIG. 9 is a diagrammatic representation of an image divided into pixel tiles, in accordance with an embodiment.

To facilitate retrieval (e.g., random or semi-random) of image data corresponding with a portion of an image, in some embodiments, the image may be divided into pixel tiles each compressed and/or decompressed as a unit. To help illustrate, a diagrammatic representation of an image 62 divided into multiple pixel tiles 64 is shown in FIG. 9. As depicted, the pixel tiles 64 include a first pixel tile 64A, a second pixel tile 64B, a third pixel tile 64C, a fourth pixel tile 64D, and so on. In some embodiments, each pixel tile 64 may have the same pixel dimensions. For example, each pixel tile 64 may correspond to 16×8 image pixels. In other embodiments, pixel tiles 64 in the same image 62 may have varying pixel dimensions.

Figure 10:
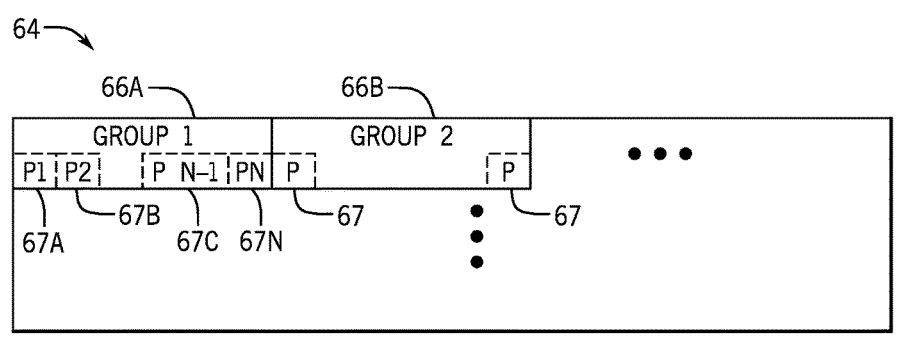
FIG. 10 is a diagrammatic representation of a pixel tile of FIG. 9 divided into pixel groups, in accordance with an embodiment.

Moreover, to facilitate providing a fixed input rate, a pixel tile 64 may be further divided into pixel groups such that each image pixel in a pixel group is compressed and/or decompressed relatively in parallel. To help illustrate, a diagrammatic representation of a pixel tile 64 divided into multiple pixel groups 66 is shown in FIG. 10. As depicted, the pixel groups 66 include a first pixel group 66A, a second pixel group 66B, and so on. In some embodiments, each pixel group 66 in a pixel tile 64 may have the same pixel dimensions, for example, 4×1 image pixels 67. In other words, more generally, a pixel group 66 may include N (e.g., 4) image pixels 67—namely a first image pixel 67A, a second image pixel 67B, and so on until an N−1th (e.g., second to last) image pixel 67C and an Nth (e.g., last) image pixel 67N.

Returning to FIG. 8, the compression engine 46 may compress uncompressed image data 53 corresponding with a pixel tile 64 as a unit. To compress the pixel tile 64, pixel groups 66 in the pixel tile 64 may successively be input and processed by the compression engine 46, for example, one pixel group 66 per clock cycle. In particular, the prediction block 56 may determine a prediction of a pixel group 66 and determine a prediction residual based at least in part on difference between the prediction and uncompressed image data 53 corresponding with the pixel group 66.

Additionally, the run encode block 58 may collapse runs of prediction residuals that span multiple pixel groups 66. For example, the run encode block 58 may include a latch 68 that stores prediction residuals corresponding with a pixel group 66 when the start of a run is detected in the pixel group 66. Additionally, the run encode block 58 may include a counter 70 that tracks number of image pixels 67 though which a run continues, for example, by incrementing when each prediction residual corresponding with a subsequent prediction group 66 is part of the run. Furthermore, the entropy encode block 60 may entropy encode remaining values to generate compressed image data 55 corresponding with the pixel tile 64.

Figure 11:
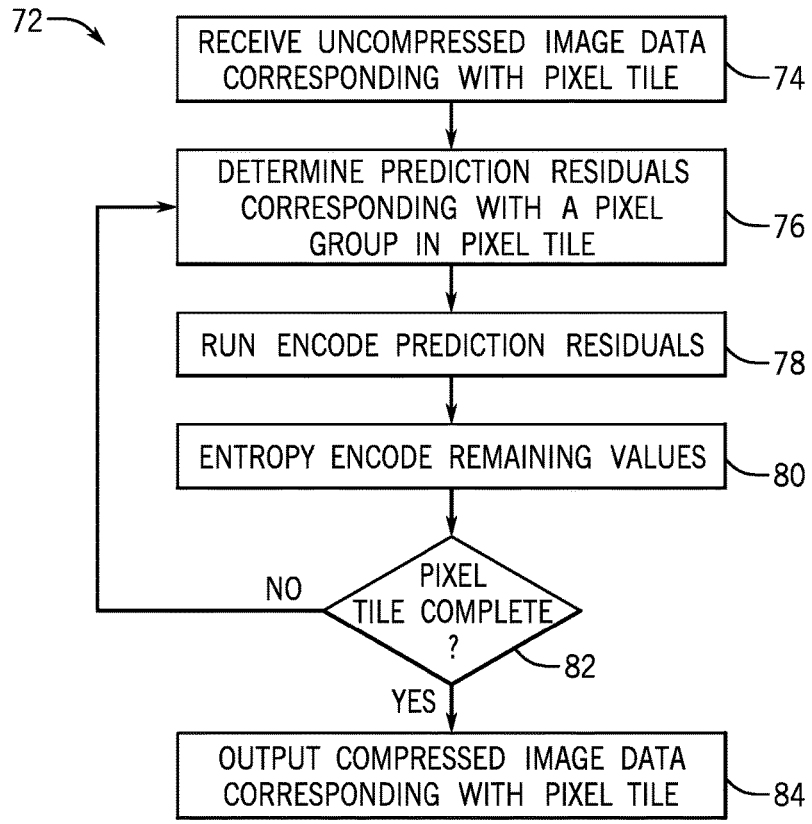
FIG. 11 is a flow diagram of a process for operating the compression engine of FIG. 8, in accordance with an embodiment.

To help further illustrate, one example of a process 72 for operating a compression engine 46 is described in FIG. 11. Generally, the process 72 includes receiving uncompressed image data corresponding with a pixel tile (process block 74), determining prediction residuals corresponding with a pixel group in the pixel tile (process block 76), run encoding the prediction residuals (process block 78), entropy encode remaining values (process block 80), determining whether processing of the pixel tile is complete (decision block 82), and outputting compressed image data corresponding with the pixel tile when processing of the pixel tile is complete (process block 84). In some embodiments, the process 72 may be implemented based on circuit connections formed in a processing pipeline 36. Additionally or alternatively, the process 72 may be implemented by executing instructions stored in a tangible non-transitory computer-readable medium, such as the controller memory 44, using processing circuitry, such as the controller processor 42.

Since compressed as a unit, the compression engine 46 may receive uncompressed image data 53 corresponding with a pixel tile 64 (process block 74). In some embodiments, the compression engine 46 may receive uncompressed image data 53 corresponding to multiple pixel groups 66 in the pixel tile 64 substantially simultaneously. Since processed based on pixel group 66, in such embodiments, uncompressed image data 53 corresponding with a pixel group 66 other than a currently processed pixel group 66 may be stored, for example, temporarily in internal memory 50 of a processing pipeline 36. Additionally or alternatively, the compression engine 46 may successively receive uncompressed image data 53 corresponding to each pixel group 66 in the pixel tile 64, for example, such that one pixel group 66 is received per clock cycle.

Figure 12:
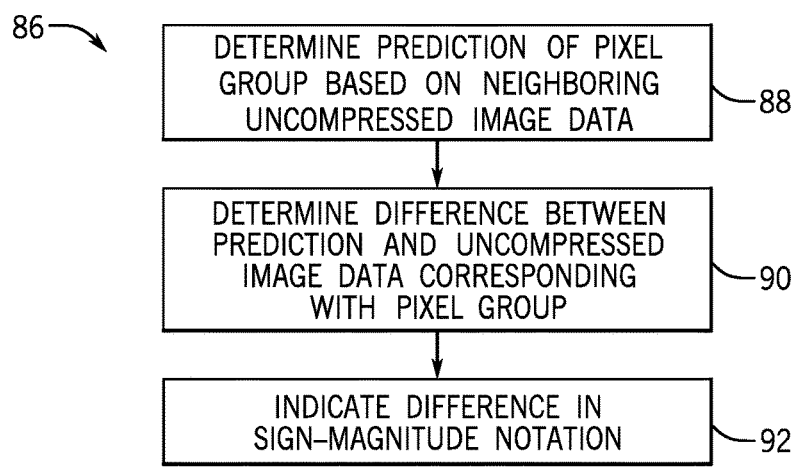
FIG. 12 a flow diagram of a process for operating a prediction block in the compression engine of FIG. 8, in accordance with an embodiment.

Based on corresponding uncompressed image data 53, the compression engine 46 may determine a prediction residual for each image pixel 67 in a current pixel group 66, for example, via the prediction block 56 (process block 76). To help illustrate, one example of a process 86 for operating a prediction block 56 is described in FIG. 12. Generally, the process 86 includes determining a prediction of a pixel group based on neighboring uncompressed image data (process block 88), determining difference between the prediction and uncompressed image data corresponding with the pixel group (process block 90), and indicating the difference in a signed-magnitude notation (process block 92). In some embodiments, the process 86 may be implemented based on circuit connections formed in a processing pipeline 36. Additionally or alternatively, the process 86 may be implemented by executing instructions stored in a tangible non-transitory computer-readable medium, such as the controller memory 44, using processing circuitry, such as the controller processor 42.

The prediction block 56 may determine a prediction of a pixel group 66 based at least in part on neighboring uncompressed image data 53 (process block 88). When processed in scan order, uncompressed image data 53 corresponding to image pixels 67 top neighboring and/or left neighboring the pixel group 66 may be previously determined (e.g., retrieved from external memory 38) and, thus, used to determine the prediction of the pixel group 66. In some embodiments, the prediction block 56 may determine the prediction relatively independent of uncompressed image data 53 corresponding with the pixel group 66, for example, by predicting that each image pixel 67 is equal to its left neighbor and/or interpolating neighboring image data based at least in part on characteristics (e.g., gradient) detected in the neighboring image data.

Additionally, the prediction block 56 may determine a prediction residual for each image pixel 67 based at least in part on difference between the prediction of the pixel group 66 and corresponding uncompressed image data 53 (process block 90). In some embodiments, a prediction residual corresponding with an image pixel 67 may be determined by subtracting the prediction of the image pixel 67 from its uncompressed image data 53. Additionally, in some embodiments, the prediction residuals may be indicated in a 2's complement notation to facilitate indicating how the prediction and corresponding uncompressed image data 53 differ.

When indicated in 2's complement notation, the prediction block 56 may convert the prediction residuals to a signed-magnitude notation (process block 92). In some embodiments, a prediction residual may be converted into signed-magnitude notation by multiplying absolute value of the prediction residual by two and adding value of the sign bit (e.g., zero or one) in the 2's complement notation. For example, in such embodiments, a value of positive two may be indicated by as four in the signed-magnitude notation. Additionally, in such embodiments, a value of negative zero (e.g., escape value) may be indicated as one in the signed-magnitude notation. In this manner, a prediction residual corresponding with each image pixel 67 in a pixel group 66 and, thus, the prediction residuals corresponding with the pixel group 66 may be determined.

Returning to the process 72 of FIG. 11, the compression engine 46 may run encode the prediction residuals, for example, via the run encode block 58. To help illustrate, an example of a process 94 for operating a run encode block 58 is described in FIG. 13. Generally, the process 94 includes receiving prediction residuals corresponding with a current pixel group (process block 96), determining whether a run starts in the current pixel group (decision block 98), and outputting the prediction residuals with a run does not start in the current pixel group (process block 100). When a run starts in the current pixel group, the process 94 includes receiving prediction residuals corresponding with a next pixel group (process block 102), determining whether the run continues into the next pixel group (decision block 104), and, when the run continues through the next pixel group, latching the prediction residual corresponding with the current pixel group (process block 106) and incrementing a counter (process block 108). When the run does not continue into the next pixel group, the process 94 includes determining whether the counter is greater than zero (decision block 110) and outputting a portion of the prediction residual corresponding with the current pixel group, an escape value, and a run length value when the counter value is greater than zero (process block 112). In some embodiments, the process 94 may be implemented based on circuit connections formed in a processing pipeline 36. Additionally or alternatively, the process 94 may be implemented by executing instructions stored in a tangible non-transitory computer-readable medium, such as the controller memory 44, using processing circuitry, such as the controller processor 42.

The run encode block 58 may receive prediction residuals corresponding with a current pixel group 66, for example, from the prediction block 56 (process block 96). Based at least in part on the prediction residuals, the run encode block 58 may determine whether a run starts in the current pixel group 66 (process block 98). As described above, a run describes consecutive prediction residuals each with the same value. For example, a zero run occurs when consecutive prediction residuals are each equal to zero. Thus, to determine whether a run starts in the current pixel group 66, the run encode block 58 may determine whether consecutive prediction residuals in the current pixel group 66 have the same value. For example, when including 4×1 image pixels 67, the run encode block 58 may determine that a zero run starts in the current pixel group 66 when the prediction residual corresponding with a second to last (e.g., N−1th) image pixel 67 and the prediction residual corresponding with the last (e.g., Nth) image pixel 67 are both equal to zero.

When a run does not start in the current pixel group 66, the run encode block 58 may output each prediction residual corresponding with the current pixel group 66 (process block 100). On the other hand, when a run starts in the current pixel group 66, the run encode block 58 may receive prediction residuals corresponding with a next pixel group 66, for example, from the prediction block 56 (process block 102). In some embodiments, the next pixel group 66 may be based on scan order. For example, with regard to FIG. 10, the next pixel group 66 may be the second pixel group 66B when the current pixel group 66 is the first pixel group 66A.

Figure 13:
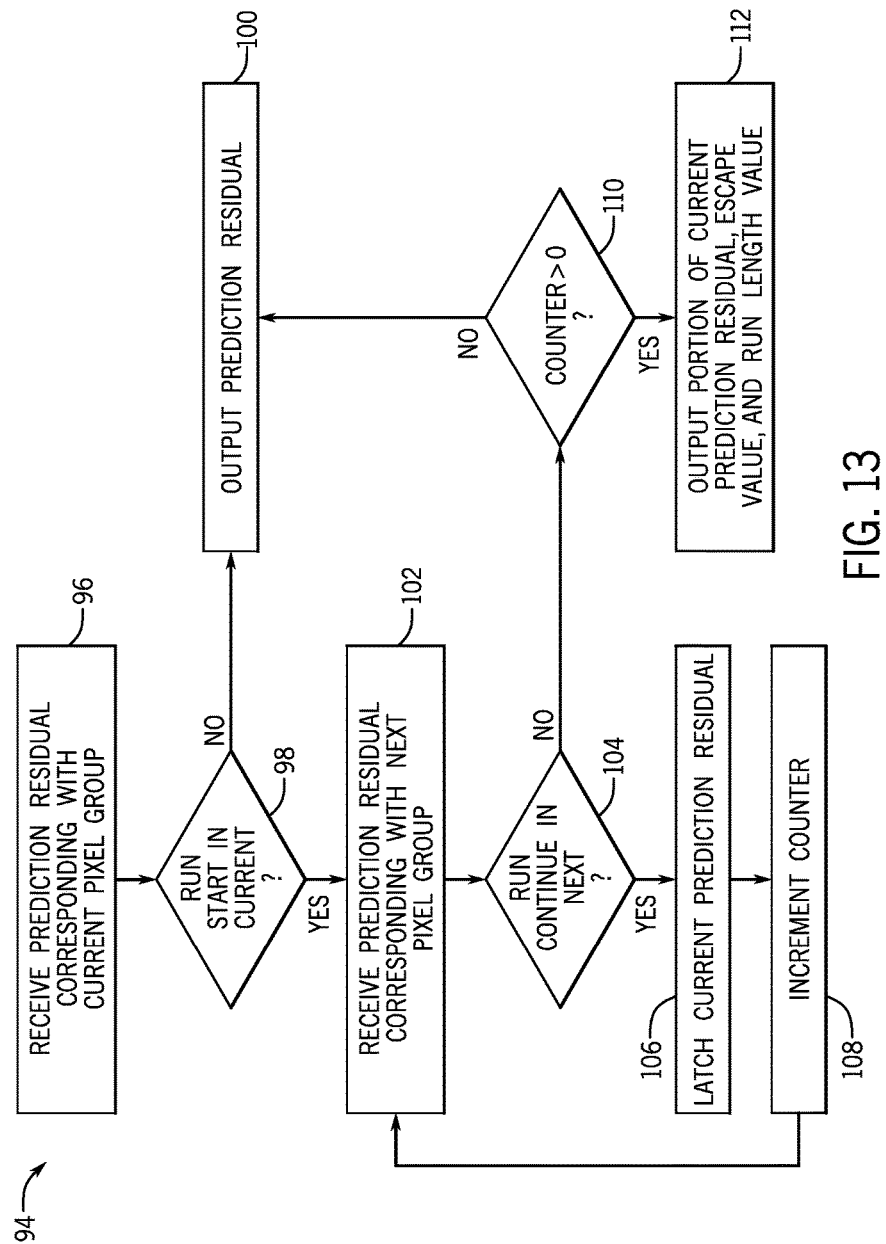
FIG. 13 is a flow diagram of a process for operating a run encode block in the compression engine of FIG. 8, in accordance with an embodiment.

Returning to the process 94 of FIG. 13, when a run starting in the current pixel group 66 is detected, the run encode block 58 may determine whether the run continues into the next pixel group 66 (decision block 104). To determine whether the run continues into the next pixel group 66, in some embodiments, the run encode block 58 may compare value of one or more prediction residuals in the next pixel group 66 with value of the run. For example, when a zero run occurs in a preceding (e.g., current) pixel group 66, the run encode block 58 may determine that the zero run continues through the next pixel group 66 when value of each prediction residual in the next pixel group 66 is zero.

When the run continues in the next pixel group 66, the run encode block 58 may latch (e.g., temporarily store) the prediction residuals corresponding with the current pixel group 66 in the latch 68 (process block 106) and increment the counter 70 (process block 108). Additionally, the run encode block 58 may iteratively check whether the run continues through subsequent pixel groups 66 and adjust the counter 70 accordingly. For example, when the run continues through a subsequent pixel group 66, the run encode block 58 may increment the counter 70. Additionally, when the end of the run is detected, the run encode block 58 may reset the counter 70 to zero.

Before resetting, the run encode block 58 may determine whether the counter 70 is greater than zero (decision block 110). As described above, the counter 70 may increment each time the run encode block 58 determines that a detected run continues through a subsequent pixel group 66. Accordingly, when the counter 70 is not greater than zero, the run encode block 58 may determine that the run starting in the current pixel group 66 does not continue into the next pixel group 66 and, thus, output the prediction residuals corresponding with the current pixel group 66, for example, from the latch 68 (process block 100). On the other hand, when the counter 70 is greater than zero, the run encode block 58 may determine that the run starting in the current pixel group 66 continues into at least one subsequent pixel group 66.

To indicate parameters (e.g., start and/or length) of the run, the run encode block 58 may output an escape value and a run length value along with a portion of the prediction residuals corresponding with the current pixel group 66, for example, from the latch 68 (process block 112). As described above, the escape value may be used to indicate starting pixel position (e.g., starting image pixel 67) of a run and the run length value may be indicative of pixel positions (e.g., image pixels 67 and/or pixel groups 66) through which the run spans. Thus, in some embodiments, the run encode block 58 may replace one or more prediction residuals of the current pixel group 66 with the escape value and the run length value. For example, when a zero run starts in the current pixel group 66 and each pixel group 66 includes 4×1 image pixels 67, the run encode block 58 may replace the prediction residual of the second to last (e.g., N–1th) image pixel 67 in the current pixel group 66 with an escape value of negative zero (e.g., one in the signed-magnitude notation). Additionally, when the zero run continues through two subsequent pixel groups 66, the run encode block 58 may replace the prediction residual of the last (e.g., Nth) image pixel 67 in the current pixel group 66 with a run length value of two (e.g., four in the signed-magnitude notation). In this manner, when a run starting in a current pixel group 66 continues into one or more subsequent pixel groups 66, run encoding may enable output values for a pixel group 66 indicate prediction residuals corresponding with the current pixel group 66 as well as prediction residuals corresponding to each of the one or more subsequent pixel groups 66.

Returning to the process 72 of FIG. 11, the compression engine 46 may entropy encode remaining values, for example, via the entropy encode block 60 (process block 80). To help illustrate, an example of a process 114 for operating an entropy encode block 60 is described in FIG. 14. Generally, the process 114 includes receiving values corresponding with a pixel group (process block 116), determining bit position of most significant non-zero bit used to indicate the values (process block 118), truncating and/or concatenating the values to determine variable length code (process block 120), and indicating highest most significant non-zero bit position in fixed length code (process block 122). In some embodiments, the process 114 may be implemented based on circuit connections formed in a processing pipeline 36. Additionally or alternatively, the process 114 may be implemented by executing instructions stored in a tangible non-transitory computer-readable medium, such as the controller memory 44, using processing circuitry, such as the controller processor 42.

The entropy encode block 60 may receive values corresponding with a pixel group 66, for example, from the run encode block 58 (process block 116). When a run spanning multiple pixel groups 66 does not start in the pixel group 66, the values may be the predication residuals corresponding with each image pixel 67 in the pixel group 66. On the other hand, when a run spanning multiple pixel groups 66 starts in the pixel group 66, the values may include prediction residuals corresponding with one or more image pixels 67 in the pixel group 66, an escape value at a starting image pixel 67 of the run, and a run length value at a next image pixel 67 following the starting image pixel 67.

Additionally, the entropy encode block 60 may determine bit position of the most significant non-zero bit used to indicate the values corresponding with the pixel group 66 in binary (process block 118). In some embodiments, the entropy encode block 60 may determine the most significant non-zero bit position of a value as log base two of the value (e.g., $\log_2$ (value)). Additionally, the entropy encode block 60 may compare the most significant non-zero bit position of each value to determine a highest most significant non-zero bit position used to indicate the values corresponding with the pixel group 66. Based at least in part on the highest most significant non-zero bit position, the entropy encode block 60 may determine compressed image data 55 corresponding with the pixel group 66. As described above, in some embodiments, compressed image data 55 corresponding with a pixel group 66 may include a fixed length code and a variable length code.

Figure 15:
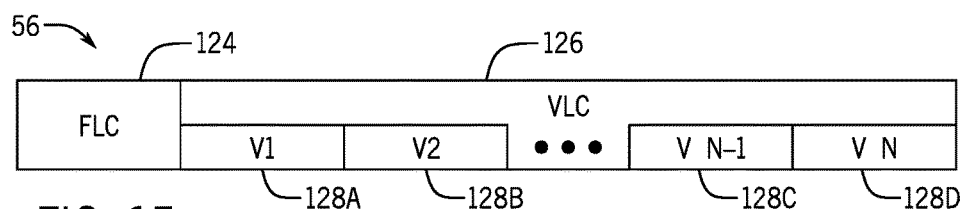
FIG. 15 is a diagrammatic representation of compressed image data generated by the compression engine of FIG. 8, in accordance with an embodiment.

To help illustrate, a diagrammatic representation of compressed image data 55 corresponding with a pixel group 66 is shown in FIG. 15. In the depicted embodiment, the compressed image data 55 includes a fixed length code 124 followed by a variable length code 126. It should be appreciated that the depicted embodiment is merely intended to be illustrative. In other embodiments, compressed image data 55 may differ from the depicted embodiment, for example, with the fixed length code 124 following the variable length code 126.

As described above, the variable length code 126 may losslessly indicate each value 128 corresponding to an image pixel 67 in the pixel group 66. For example, with reference to the first pixel group 64A in FIG. 10, the variable length code 126 includes a first value 128A corresponding to the first image pixel 67A, a second value 128B corresponding to the second image pixel 67B, an N–1th value 128C corresponding to the N–1th image pixel 67C, an Nth value 128N corresponding to the Nth image pixel 67N, and so on.

Figure 14:
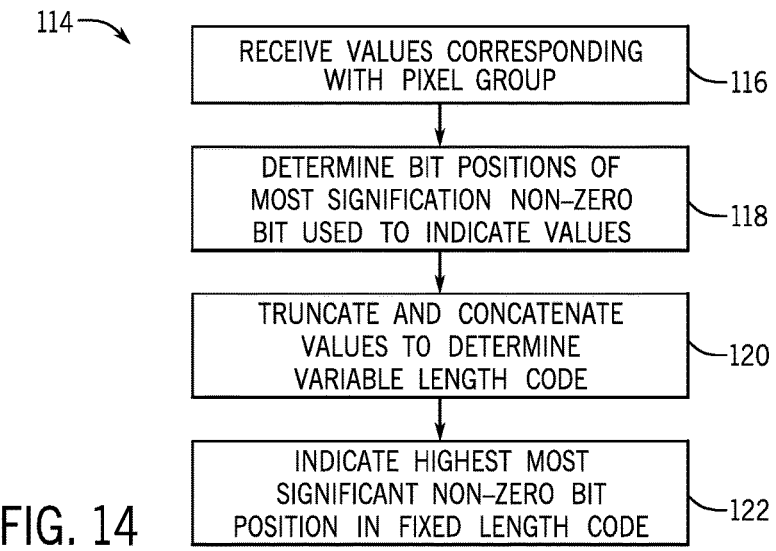
FIG. 14 is a flow diagram of a process for operating an entropy encode block in the compression engine of FIG. 8, in accordance with an embodiment.

Returning to the process 114 of FIG. 14, the entropy encode block 60 may determine variable length code 126 by truncating and/or concatenating the values 128 corresponding with the pixel group 66 (process block 120). In particular, to facilitate improving compression efficiency, the entropy encode block 60 may concatenate the values 128, for example, based on scan order within the pixel group 66. For example, with regard to FIG. 15, the values 128 are concatenated such that the first value 128A is followed by the second value 128B, the N–1th value 128C is followed by the Nth value 128N, and so on.

Moreover, to facilitate further improving lossless compression efficiency, the values 128 corresponding with the pixel group 66 may be truncated before concatenating, for example, when each value 128 indicated in binary includes one or more leading zeros. In other words, to provide lossless compression, the entropy encode block 60 may truncate each value 128 based on the highest most significant non-zero bit position. For example, when the first value 128A is seven, the second value 128B is two, the N–1th value 128C is one, and the Nth value 128N is four, the highest most significant non-zero bit position among the values 128 may be three. Thus, the values 128 corresponding with the first pixel group 66 may each be losslessly indicated using three bits, for example, by truncating binary representation of the first value 128A from 00111 to 111, the second value 128B from 00010 to 010, and so on. As such, the number of bits used to losslessly indicate the values 128 corresponding with different pixel groups 66 may vary. For example, values 128 corresponding with the second pixel group 66B may each be losslessly indicated using four bits.

Thus, to facilitate subsequent decompression, which will be described in more detail below, the entropy encode block 60 may indicate the highest most significant non-zero bit position of the values 128 corresponding with the pixel group 66 in the fixed length code 124 (process block 122). For example, when the fixed length portion includes four bits and the highest most significant non-zero bit position is three, the entropy encode block 60 may indicate 0011 in the fixed length code 124. In this manner, entropy encoding may generate compressed image data 55 corresponding with a pixel group 66 such that the fixed length code 124 facilitates identifying which bits in the variable length code 126 correspond to each image pixel 67 in the pixel group 66.

Returning to the process 72 of FIG. 11, the processing pipeline 36 may successively process pixel groups 66 until each pixel group 66 in the pixel tile 64 has been processed (decision block 82). Generally, each pixel group 66 in a pixel tile 64 may be processed in a similar manner. However, at least in some instances, entropy encoding for a pixel tile 64 may be obviated, for example, when corresponding pixel residuals are part of a run starting in a preceding pixel tile 64 and, thus, indicated via compressed image data 55 corresponding with the preceding pixel tile 64.

After processing each pixel group 66, the processing pipeline 36 may determine compressed image data 55 corresponding with the current pixel tile 64 (process block 84). As described above, image data corresponding with a pixel tile 64 may subsequently be processed, for example, by another processing pipeline 36. Thus, to facilitate subsequent determination, in some embodiments, the processing pipeline 36 may store the compressed image data 55 in the external memory 38, for example, via the DMA block 52.

Figure 16:
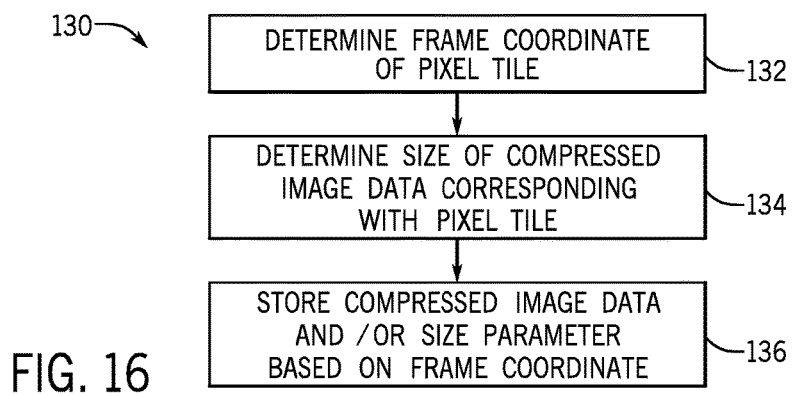
FIG. 16 is a flow diagram of a process for operating a direct memory access (DMA) block in the image data processing pipeline of FIG. 7 to store compressed image data, in accordance with an embodiment.

To help illustrate, one example of a process 130 for operating a direct memory access (DMA) block 52 to store data is described in FIG. 16. Generally, the process 130 includes determining frame coordinates of a pixel tile (process block 132), determining size of corresponding compressed image data (process block 134), and storing the compressed image data and/or a size parameter based on the frame coordinates (process block 136). In some embodiments, the process 130 may be implemented based on circuit connections formed in a processing pipeline 36. Additionally or alternatively, the process 130 may be implemented by executing instructions stored in a tangible non-transitory computer-readable medium, such as the controller memory 44, using processing circuitry, such as the controller processor 42.

The direct memory access block 52 may determine frame coordinates of a pixel tile 64 (process block 132). The frame coordinates may be indicative of location of the pixel tile 64 within a corresponding image 62. Thus, in some embodiments, frame coordinates of a pixel tile 64 may be determined based on scan order of the image 62. For example, with regard to the image 62 of FIG. 9, frame coordinates of the first pixel tile 64A may be [1,1], frame coordinate of the second pixel tile 64B may be [2,1], frame coordinates of the third pixel tile 64C may be [1,2], frame coordinates of the fourth pixel tile 64D may be [2,2], and so on.

Additionally or alternatively, frame coordinates of a pixel tile 64 may be identified via pixel position of one or more image pixels 67 in the pixel tile 64. In some embodiments, the frame coordinates of the pixel tile 64 may be identified based on pixel position of a top-left image pixel 67. For example, with regard to the pixel tile 64 of FIG. 10, pixel position of the first image pixel 67 may be used as the frame coordinates of the pixel tile 64. In other embodiments, frame coordinates of a pixel tile 64 may be identified based on pixel position of one or more central-most image pixels 67 in the pixel tile 64.

Returning to the process 130 of FIG. 16, the direct memory access block 52 may determine size of compressed image data 55 corresponding with the pixel tile 64 (process block 132). In some embodiments, the direct memory access block 52 may determine size of compressed image data 55 by counting number of bits included in the compressed image data 55. Additionally or alternatively, when fixed length codes 124 are expected to include a predetermined fixed number of bits, the direct memory access block 52 may determine size of compressed image data 55 by counting number of bits included in the variable length code 126 and adding the predetermined number of bits used to indicate the fixed length code 124.

Figure 17:
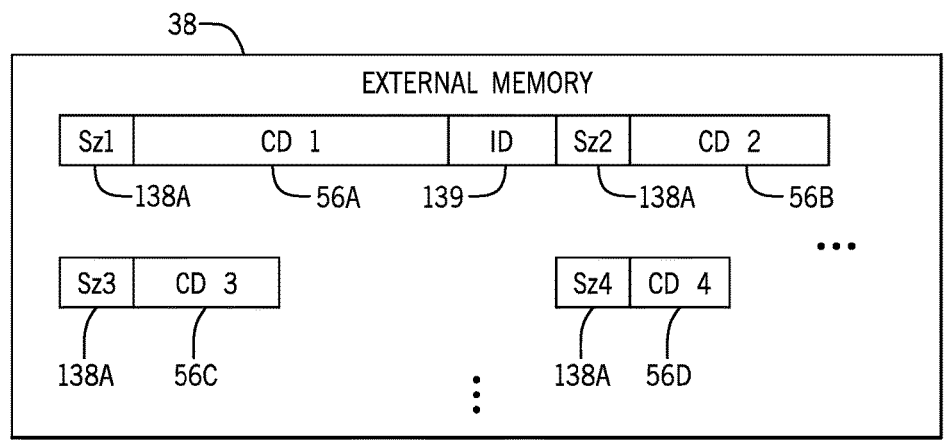
FIG. 17 is a diagrammatic representation of an example of compressed image data stored in the external memory of FIG. 6, in accordance with an embodiment.
Figure 18:
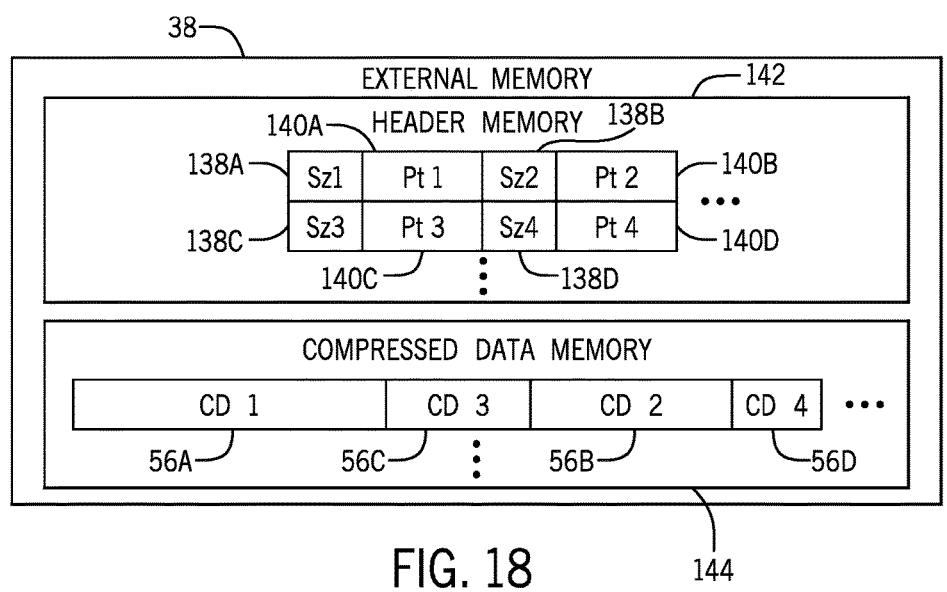
FIG. 18 is a diagrammatic representation of another example of compressed image data stored in the external memory of FIG. 6, in accordance with an embodiment.

Based at least in part on the frame coordinates, the direct memory access block 52 may store compressed image data 55 and/or size parameters indicative of compressed image data size in external memory 38 (process block 136). To help illustrate, diagrammatic representations of external memory 38 storing compressed image data 55 and size parameters 138 corresponding to multiple pixel tiles 64 are shown in FIGS. 17 and 18. It should be appreciated that the depicted embodiments are merely intended to be illustrative and not limiting. In other words, in other embodiments, compressed image data 55 and/or size parameters 138 may be stored in any suitable manner that enables identification for subsequent retrieval.

As depicted, the external memory 38 stores first compressed image data 55A, second compressed image data 55B, third compressed image data 55C, and fourth compressed image data 55D. By way of example, with reference to the image 62 of FIG. 9, the external memory 38 the first compressed image data 55A may correspond with the first pixel tile 64A, the second compressed image data 55B may correspond with the second pixel tile 64B, the third compressed image data 55C may correspond with the third pixel tile 64C, and the fourth compressed image data 55D may correspond with the fourth pixel tile 64D. Additionally, as depicted, the external memory 38 stores a first size parameter 138A that indicates size (e.g., number of bits) of the first compressed image data 55A, a second size parameter 138B that indicates size of the second compressed image data 55B, a third size parameter 138C that indicates size of the third compressed image data 55C, and a fourth size parameter 138D that indicates size of the fourth compressed image data 55D.

In particular, with regard to FIG. 17, the external memory 38 stores the first size parameter 138A at memory addresses based on frame coordinates of the first pixel tile 64A followed by the first compressed image data 55A, the second size parameter 138B at memory addresses based on frame coordinates of second pixel tile 64B followed by the second compressed image data 55A, and so on. Thus, as will be described in more detail below, compressed image data 55 for a target pixel tile 64 may be retrieved (e.g., read and communicated) from the external memory 38 based at least in part on a corresponding size parameter 138 and corresponding frame coordinates, for example, by a DMA block 52 via a communication bus 39.

As described above, a communication bus 39 generally has a fixed bandwidth and, thus, enables the direct memory access block 52 to retrieve up to a maximum number of bits per read operation. Moreover, due at least in part to the variable size of variable length code 126, storing compressed image data 55 and corresponding size parameters 138 in this manner may result in the direct memory access block 52 retrieving data irrelevant to a targeted pixel tile 64. For example, when bandwidth implemented on a communication bus 39 is greater than size of the first compressed image data 55A, retrieving compressed image data 55 for the first pixel tile 64A may also return one or more bits of data 139 irrelevant to any of the pixel tiles 64 in a corresponding image 62.

To facilitate improving communication efficiency, in some embodiments, the external memory 38 may store compressed image data 55, size parameters 138, and pointers 140 in the manner shown in FIG. 18. In particular, the external memory 38 includes header memory 142, which stores the size parameters 138 followed by a corresponding pointer 140, and compressed data memory 144, which stores compressed image data 55 corresponding with different pixel tiles 64 in consecutive memory addresses. In some embodiments, each size parameter 138 may be stored in the header memory 142 based on frame coordinates of a corresponding pixel tile 64. To facilitate retrieval, each pointer 140 may indicate one or more memory addresses used to store corresponding compressed image data 55. For example, a first pointer 140A may indicate a starting memory address of the first compressed image data 55A, a second pointer 140B may indicate a starting memory address of the second compressed image data 55B, a third pointer 140C may indicate a starting memory address of the third compressed image data 55C, a fourth pointer 140D may indicate a starting memory address of the fourth compressed image data 55D, and so on.

In some embodiments, to facilitate improving communication efficiency, order with which compressed image data 55 is stored in the compressed data memory 144 may differ from scan (e.g., processing) order of pixel tiles 64 within a corresponding image 62. For example, in the depicted embodiment, the third compressed image data 55C is stored between the first compressed image data 55A and the second compressed image data 55B. Thus, when bandwidth implemented on a communication bus 39 is greater than size of the first compressed image data 55A, retrieving image data corresponding with the first pixel tile 64A may also return at least a portion of the third compressed image data 55C. Moreover, when bandwidth implemented on a communication bus 39 is greater than size of the second compressed data 55B, retrieving image data corresponding to the second pixel tile 64B may also return at least a portion of the third compressed image data 55C and/or the fourth compressed image data 55D.

As will be described in more detail below, in some embodiments, image data (e.g., compressed image data 55 and/or uncompressed image data 53) corresponding to a pixel tile 64 other than a targeted pixel tile 64 may be internally (e.g., temporarily) stored in anticipation of the other pixel tile 64 subsequently being targeted. For example, when retrieving the first compressed image data 55A also returns a portion of the third compressed image data 55C, a processing pipeline 36 may store the returned portion of the third compressed image data 55C in internal memory 50. Additionally, when retrieving the second compressed image data 55B also returns a portion of the third compressed image data 55C, the processing pipeline 36 may store the returned portion of the third compressed image data 55C in internal memory 50. In fact, in some instances, the third compressed image data 55C may be completely stored in internal memory 50 before the third pixel tile 64 is even targeted. In this manner, amount of data retrieved from external memory 38 when a subsequent (e.g., third) pixel tile 64 is targeted may be reduced, thereby improving communication efficiency.

Figure 19:
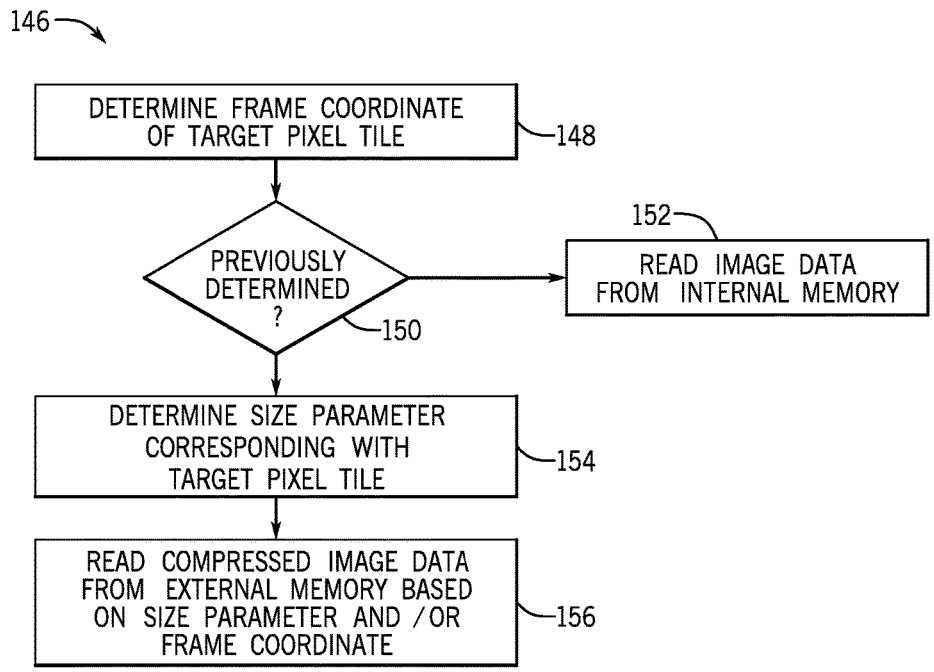
FIG. 19 is a flow diagram of a process for operating the direct memory access (DMA) block in the image data processing pipeline of FIG. 7 to retrieve compressed image data, in accordance with an embodiment.

When at least a portion has not been previously determined, the processing pipeline 36 may retrieve compressed image data 55 corresponding with a target pixel tile 64, for example, from external memory 38 via the DMA block 52. To help illustrate, one example of a process 146 for operating a direct memory access (DMA) block 52 to retrieve data is described in FIG. 19. Generally, the process 146 includes determining frame coordinates of a target pixel tile (process block 148), determining whether the target pixel tile has been previously determined (decision block 150), and reading image data from internal memory when the target pixel tile has been previously determined (process block 152). When the target pixel tile has not been previously determined, the process 146 includes determining a size parameter corresponding with the target pixel (process block 154) and reading compressed image data from external memory based on the size parameter and/or the frame coordinates (process block 156). In some embodiments, the process 146 may be implemented based on circuit connections formed in a processing pipeline 36. Additionally or alternatively, the process 146 may be implemented by executing instructions stored in a tangible non-transitory computer-readable medium, such as the controller memory 44, using processing circuitry, such as the controller processor 42.

The direct memory access block 52 may determine frame coordinates of a target pixel tile 64 (process block 148). Additionally, the direct memory access block 52 may determine how much of the compressed image data 55 corresponding with the target pixel tile 64 has been previously determined (decision block 150). In some embodiments, the direct memory access block 52 may determine how much of the compressed image data 55 has been previously determined based at least in part on communication bandwidth implemented on a communication bus 39, size of previously retrieved compressed image data 55, size of compressed image data 55 corresponding with the target pixel tile 64, memory addresses used to store previously retrieved compressed image data 55, and/or memory addresses used to store compressed image data 55 corresponding with the target pixel tile 64. For example, when the first pixel tile 64A is targeted before the third pixel tile 64C, the direct memory access block 52 may determine amount of the third compressed image data 55C that was previously retrieved with the first compressed image data 55A based at least in part on difference between communication bandwidth implemented on a communication bus 39 and size of the first compressed image data 55A.

When at least a portion is previously determined, the direct memory access block 52 may retrieve image data (e.g., compressed image data 55 or uncompressed image data 53) corresponding with the targeted pixel tile 64 from internal memory 50 (process block 152). As described above, this may facilitate improving communication efficiency, for example, by reducing amount of data retrieved from external memory 38 when a pixel tile 64 is targeted. In fact, in some embodiments, the direct memory access block 52 may adaptively adjust which memory addresses in external memory 38 are read when at least a portion of image data corresponding with the targeted pixel tile 64 is stored in internal memory 50, for example, to retrieve more compressed image data 55 corresponding with one or more pixel tiles 64 expected to be subsequently targeted Moreover, storing data in external memory 38 versus internal memory 50 may present various implementation associated cost and/or processing efficiency tradeoffs. For example, due at least in part to physical sizing constraints, increasing storage capacity of external memory 38 may be easier than increasing storage capacity of internal memory 50. As such, storage capacity of external memory 38 may generally be larger than storage capacity of the internal memory 50.

Additionally, access to the external memory 38 and the internal memory 50 may differ. For example, internal memory 50 may be dedicated for use by a corresponding processing pipeline 36. In other words, data stored the internal memory 50 more readily accessible by the processing pipeline 36, for example, with reduced latency, which may facilitate improving processing efficiency of the processing pipeline 36. Comparatively, since external from the processing pipeline 36, the processing pipeline 36 may access the external memory 38 via a communication bus 39 (e.g., DMA channel). However, to provide data access in this manner, the communication bus 39 may be implemented with increased bandwidth, which increases implementation associated cost. Moreover, when the external memory 38 is shared with other components, data access latency and, thus, processing efficiency of the processing pipeline 36 may be affected.

When at least a portion is not previously determined, the direct memory access block 52 may retrieve compressed image data 55 corresponding with the targeted pixel tile 64 from internal memory 50 by determining a corresponding size parameter 138 (process block 154) and reading memory addresses in external memory 38 based at least in part on the size parameter 138 and/or the frame coordinates of the targeted pixel tile 64 (process block 156). As described above, in some embodiments, a size parameter 138 may be stored in external memory 38 based on frame coordinates of a corresponding pixel tile 64. Thus, in such embodiments, the direct memory access block 52 may determine a size parameter 138 corresponding to the targeted pixel tile 64 based at least in part on frame coordinates of the targeted pixel tile 64, for example, by reading external memory 38 accordingly.

Additionally, as described above, a size parameter 138 may indicate size (e.g., number of bits) of corresponding compressed image data 55. Thus, to determine compressed image data 55, the direct memory access block 52 may determine a starting memory address used to store the compressed image data 55 (e.g., based on frame coordinates and/or a pointer 140) and read subsequent memory addresses based on the size parameter 138. As described above, in some instances, retrieving compressed image data 55 corresponding with a target pixel tile 64 may also return compressed image data 55 corresponding with one or more other pixel tiles 64. Thus, to facilitate improving communication efficiency, the direct memory access block 52 may store compressed image data 55 and/or corresponding uncompressed image 53 for the one or more other pixel groups 64 in internal memory 50.

As described above, one or more image data processing blocks 54 in a processing pipeline 36 may be implemented to process (e.g., operate on) uncompressed image data 53. Thus, when compressed image data 55 is retrieved, a processing pipeline 36 may decompress the compressed image data 55 before subsequent processing, for example, via the decompression engine 48. To provide lossless decompression, the decompression engine 48 may generally perform reverse operations in a reverse order relative to a compression engine 46. As such, in some embodiments, the decompression engine 48 may utilize the same circuitry as a compression engine 46 in the same processing pipeline 36.

Figure 20:
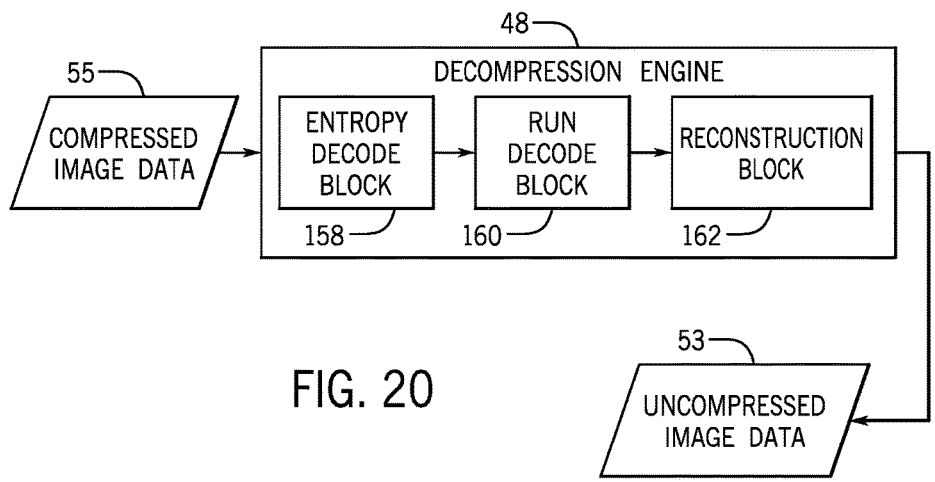
FIG. 20 is a block diagram of a de-compression engine in the image data processing pipeline of FIG. 7, in accordance with an embodiment.

To simplify discussion, an example of a decompression engine 48 is shown in FIG. 20. In operation, the decompression engine 48 may receive compressed image data 55 and generate uncompressed image data 53. In some embodiments, the compressed image data 55 may be received from a direct memory access block 52 and/or any other electronic device that suitably generates or outputs compressed image data 55. Additionally, in some embodiments, the uncompressed image data 53 may be output to an image data processing block 54, internal memory 50, and/or any other electronic devices that suitably processes or stores uncompressed image data 53.

As described above, the decompression engine 48 may process compressed image data 55 to generate corresponding uncompressed image data 53. To simplify discussion, the functions (e.g., operations) performed by the decompression engine 48 are divided between various processing blocks (e.g., circuitry or modules). For example, in the depicted embodiment, the decompression engine 48 includes an entropy decode block 158, a run decode block 160, and a reconstruction block 162.

Since compressed as a unit, the decompression engine 48 may decompress compressed image data 55 corresponding with a pixel tile 64 as a unit. In particular, the entropy decode block 158 may entropy decode values 128 in the compressed image data 55. Additionally, the run decode block 160 may expand (e.g., repopulate) one or more prediction residual runs collapsed to generate the compressed image data 55. Furthermore, the reconstruction block 162 may determine a prediction of a pixel group 66 in the pixel tile and apply corresponding prediction residuals to the prediction to determine uncompressed image data 53 corresponding with the pixel group 66.

Figure 21:
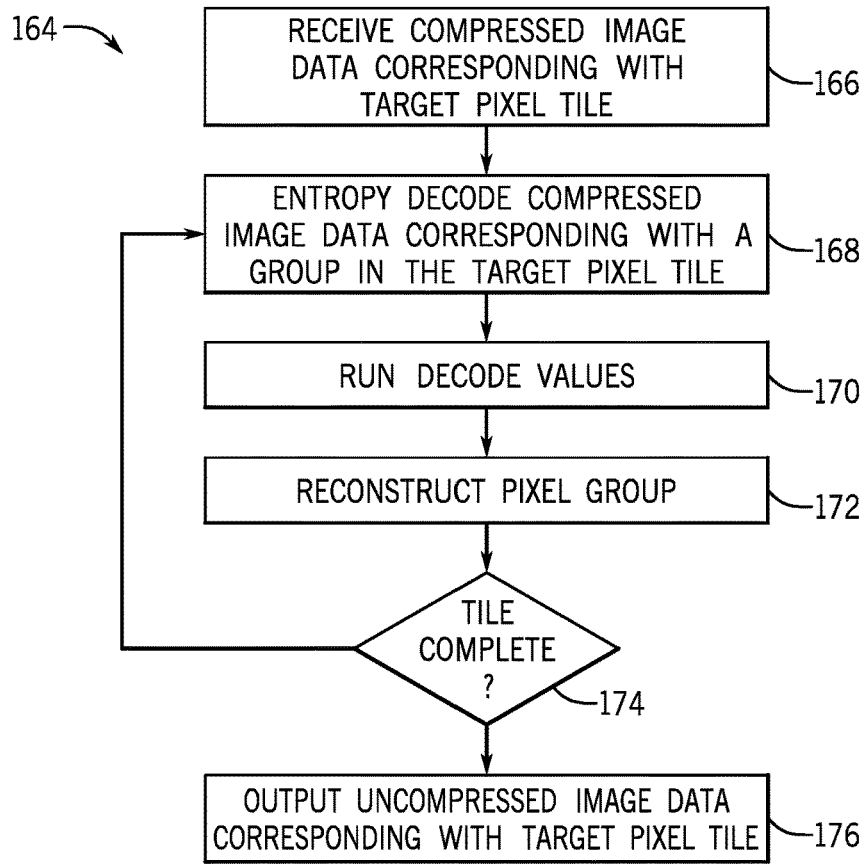
FIG. 21 is a flow diagram of a process for operating the de-compression engine of FIG. 20, in accordance with an embodiment.

To help illustrate, one example of a process 164 for operating a decompression engine 48 is described in FIG. 21. Generally, the process 164 includes receiving compressed image data corresponding with a target pixel tile (process block 166), entropy decoding compressed image data corresponding with a pixel group in the target pixel tile (process block 168), run decoding resulting values (process block 170), reconstructing the pixel group (process block 172), determining whether processing of the pixel tile is complete (decision block 174), and outputting uncompressed image data corresponding with the pixel tile when processing of the pixel tile is complete (process block 176). In some embodiments, the process 164 may be implemented based on circuit connections formed in a processing pipeline 36. Additionally or alternatively, the process 164 may be implemented by executing instructions stored in a tangible non-transitory computer-readable medium, such as the controller memory 44, using processing circuitry, such as the controller processor 42.

Since decompressed as a unit, the decompression engine 48 may receive compressed image data 55 corresponding with a target pixel tile 64 (process block 166). In some embodiments, the decompression engine 48 may receive compressed image data 55 corresponding to multiple pixel groups 66 in the target pixel tile 64 substantially simultaneously. Since processed based on pixel group 66, in such embodiments, compressed image data 55 corresponding with a pixel group 66 other than a currently processed pixel group 66 may be stored, for example, temporarily in internal memory 50 of a processing pipeline 36. Additionally or alternatively, the decompression engine 48 may successively receive compressed image data 55 corresponding to each pixel group 66 in the target pixel tile 64, for example, such that one pixel group 66 is received per clock cycle.

Figure 22:
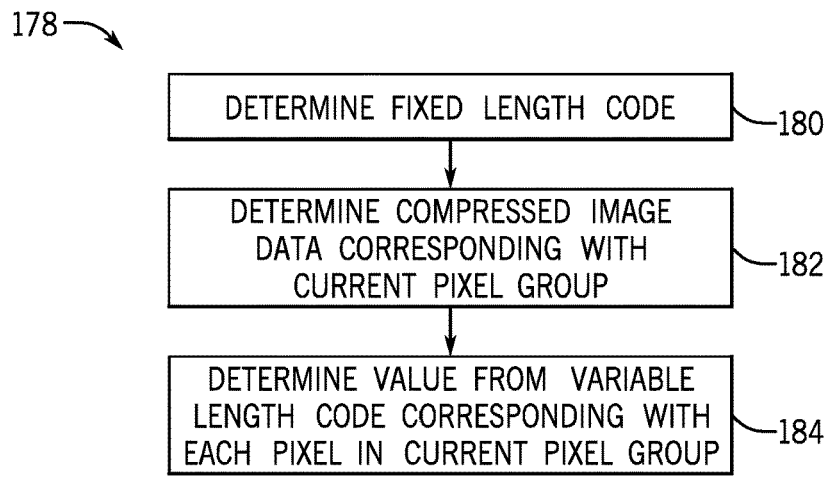
FIG. 22 is a flow diagram of a process for operating an entropy decode block in the de-compression engine of FIG. 20, in accordance with an embodiment.

The decompression engine 48 may entropy decode compressed image data 55 corresponding to a pixel group 66 in the target pixel tile 64, for example, via the entropy decode block 158. To help illustrate, an example of a process 178 for operating an entropy decode block 158 is described in FIG. 22. Generally, the process 178 includes determining a fixed length code (process block 180), determining compressed image data corresponding with a current pixel group (process block 182), and determining values from variable length code corresponding with each image pixel in the current pixel group (process block 184). In some embodiments, the process 178 may be implemented based on circuit connections formed in a processing pipeline 36. Additionally or alternatively, the process 178 may be implemented by executing instructions stored in a tangible non-transitory computer-readable medium, such as the controller memory 44, using processing circuitry, such as the controller processor 42.

The entropy decode block 158 may determine one or more fixed length codes 124 included in compressed image data 55 corresponding with a pixel tile 64 (process block 180). As described above, a fixed length code 124 may indicate number of bits in corresponding variable length code 126 used to indicate a value 128. Accordingly, when each pixel group 66 includes the same number of image pixels 67 and each fixed length code includes the same number of bits, the entropy decode block 158 may determine allocation of compressed image data 55 corresponding with the pixel tile 64 between the pixel groups 66 (process block 182).

Additionally, based at least in part on a fixed length code 124, the entropy decode block 158 may determine a value 128 from corresponding variable length code 126 associated with each image pixel 67 in a pixel group 66 (process block 184). As described above, compressed image data 55 may be generated by concatenating values 128 corresponding to image pixels 67 in a pixel group 66. Thus, based on the fixed length code 124, the entropy decode block 158 may determine which bits in the variable length code 126 are intended to be interpreted together to indicate a value 128 in binary. For example, when the fixed length code 124 is 011 (e.g., decimal three) and the variable length code is 111010, the entropy decode block 158 may determine that bits 111 are intended be interpreted as a first value 128A and bits 010 are intended to be interpreted as a second value 128B.

As described above, in some instances, compressed image data 55 may be generated by truncating leading zeros before concatenating. Thus, the entropy decode block 158 may zero pad each values 128 corresponding with an image pixel 67 in a current pixel group 66, for example, when a downstream image data processing block 54 expects to process image data with a higher bit depth. For example, when the downstream image data processing block 54 expects to process image data with a bit depth of five, the entropy decode block 158 may zero pad such that the first value 128 is indicated as 00111 and the second value is indicated as 00010. In this manner, compressed image data 55 corresponding with a pixel group 66 may be entropy decoded.

Figure 23:
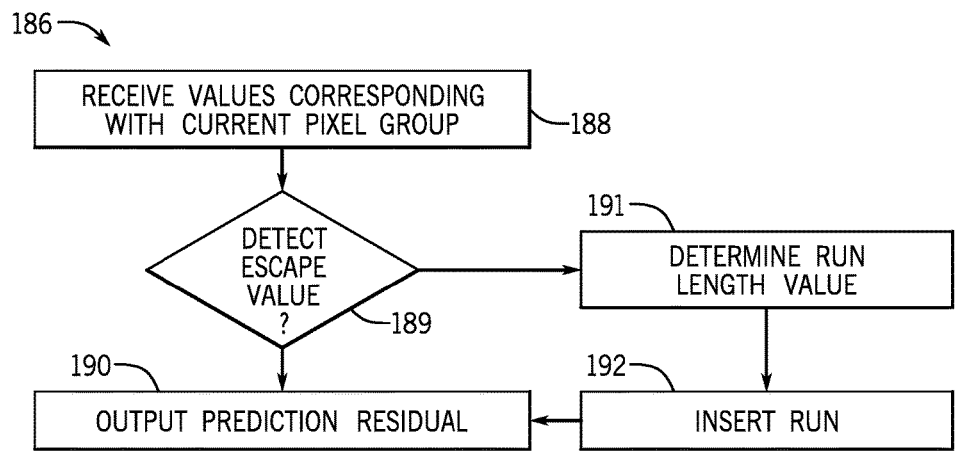
FIG. 23 is a flow diagram of a process for operating a run decode block in the de-compression engine of FIG. 20, in accordance with an embodiment.

Returning to the process 164 of FIG. 21, the decompression engine 48 may run decode the entropy decoded values 128, for example, via the run decode block 160. To help illustrate, one example of a process 186 for operating a run decode block 160 is described in FIG. 23. Generally, the process 186 includes receiving values corresponding with a current pixel group (process block 188), determining whether an escape value is detected (decision block 189), and outputting a prediction residual when the escape value is not detected (process block 190). When the escape value is detected, the process 164 includes determining a run length value (process block 191) and inserting a run (process block 192). In some embodiments, the process 186 may be implemented based on circuit connections formed in a processing pipeline 36. Additionally or alternatively, the process 186 may be implemented by executing instructions stored in a tangible non-transitory computer-readable medium, such as the controller memory 44, using processing circuitry, such as the controller processor 42.

The run decode block 160 may receive values 128 corresponding with a current pixel group 66, for example, from the entropy decode block 158 (process block 188). Additionally, the run decode block 160 may detect whether the values 128 include an escape value (decision block 189). For example, the run decode block 160 may parse (e.g., traverse) the values 128 to determine whether an escape value (e.g., −0 or one in signed-magnitude notation) is included. As described above, the escape value may indicate starting pixel position (e.g., image pixel 67) of a run.

Thus, when not detected, the run decode block 160 may determine that each of the values 128 is a prediction residual corresponding to an image pixel 67 in the current pixel group 66 and output the prediction residuals corresponding with the current pixel group 66 (process block 190). On the other hand, when the escape value is detected, the run decode block 160 may determine a run length value from the values 128 corresponding with the current pixel group (process block 191). As described, in some embodiments, a run length value may be indicated at a pixel position following a corresponding escape value. Additionally, as described above, the run length value may be indicative of number of pixel positions through which a run continues.

Thus, based at least in part on the run length value, the run decode block 160 may insert a run when the escape value is detected (process block 192). For example, when the escape value indicates starting pixel position of a zero run and the run length value is two (e.g., four in the signed-magnitude notation), the run decode block 160 may determine that each prediction residual corresponding to the next two pixel groups 66 is zero. Additionally, as described above, the escape value and the run length value may each be indicated by replacing a prediction residual corresponding to an image pixel 67 in the current pixel group 66. Thus, when the escape values indicates starting pixel position of a zero run, the run decode block 160 may determine that prediction residuals corresponding to image pixels 67 at which the escape value and/or the run length value are indicated equal zero. In this manner, run decoding may determine prediction residuals corresponding with one or more pixel groups 66 in a pixel tile 64.

Figure 24:
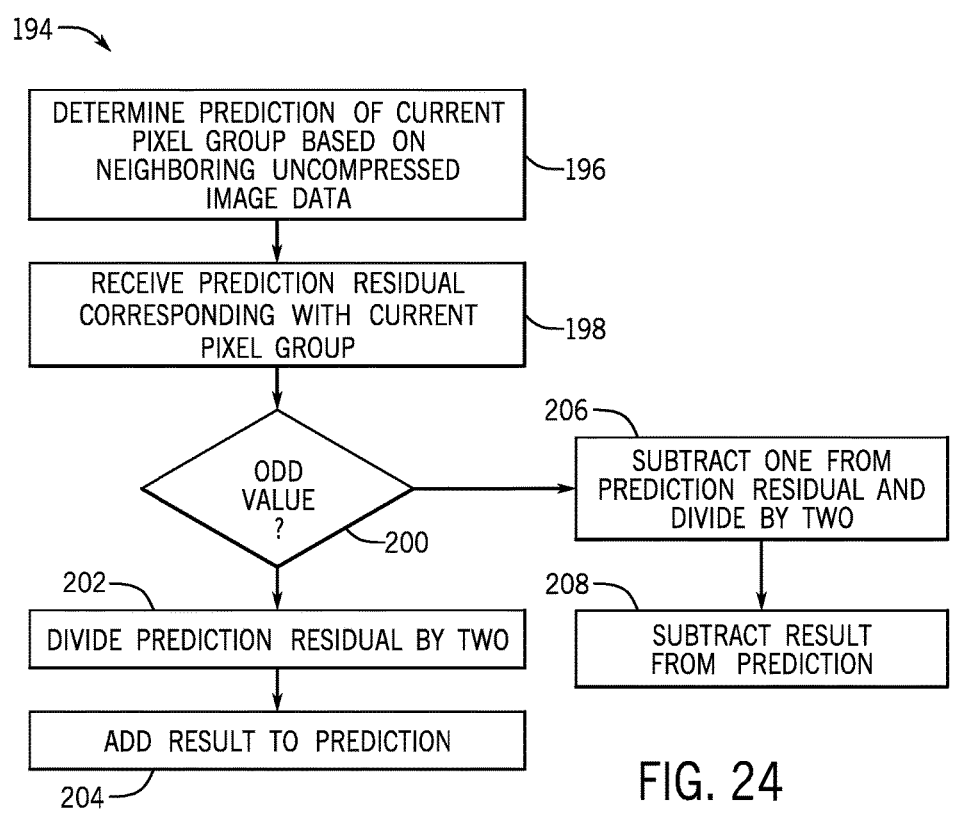
FIG. 24 is a flow diagram of a process for operating the reconstruction block in the de-compression engine of FIG. 20, in accordance with an embodiment.

Returning to the process 164 of FIG. 21, the decompression engine 48 may reconstruct a pixel group 66 based at least in part on corresponding prediction residuals, for example, via the reconstruction block 162. To help illustrate, one example of a process 194 for operating a reconstruction block 162 is described in FIG. 24. Generally, the process 194 includes determining a prediction of a pixel group based on neighboring uncompressed image data (process block 196), receiving a prediction residual corresponding with the pixel group (process block 198), determining whether the prediction residual is an odd value (decision block 200), and, when not an odd value, dividing the prediction residual by two (process block 202) and adding a corresponding result to the prediction (process block 204). When an odd value, the process 194 includes subtracting one from the prediction residual and dividing by two (process block 206) and subtracting a corresponding result from the prediction (process block 208). In some embodiments, the process 194 may be implemented based on circuit connections formed in a processing pipeline 36. Additionally or alternatively, the process 194 may be implemented by executing instructions stored in a tangible non-transitory computer-readable medium, such as the controller memory 44, using processing circuitry, such as the controller processor 42.

The reconstruction block 162 may determine a prediction of a pixel group 66 based on neighboring uncompressed image data 53 (process block 88). When processed in scan order, uncompressed image data 53 at pixel positions top neighboring and/or left neighboring the current pixel group 66 may be previously determined (e.g., decompressed) and, thus, used to determine the prediction of the current pixel group 66. Similar to the prediction block 56, in some embodiments, the reconstruction block 162 may determine the prediction relatively independent from uncompressed image data 53 of the current pixel group 66, for example, by predicting that each image pixel 67 is equal to its left neighbor and/or interpolating neighboring image data based at least in part on characteristics (e.g., gradient) detected in the neighboring image data.

Additionally, the reconstruction block 162 may receive a prediction residual corresponding with each image pixel 67 in the pixel group 66, for example, from the run decode block 160 (process block 198). As described above, in some embodiments, compressed image data 55 may be generated based at least in part on a prediction residual indicated in a signed-magnitude notation, for example, by multiplying absolute value of the prediction residual by two and adding value of a sign bit in a 2's complement notation. Thus, the reconstruction block 162 may determine that odd valued prediction residuals in the signed-magnitude notation are indicative of a negative value in the 2's complement notation.

Accordingly, for each odd valued prediction residual in the signed-magnitude notation, the reconstruction block 162 may subtract one and divide by two to determine a result indicative of prediction residual magnitude (process block 206). Additionally, the reconstruction block 162 may subtract each result from the prediction of a corresponding image pixel 67 to determine uncompressed image data 53 for the corresponding image pixel 67 (process block 208). On the other hand, for each non-odd (e.g., zero or even) valued prediction residuals in the signed-magnitude notation, the reconstruction block 162 may divide by two to determine a result indicative of prediction residual magnitude (process block 202). Additionally, the reconstruction block 162 may add each result to the prediction of a corresponding image pixel 67 to determine uncompressed image data 53 for the corresponding image pixel 67 (process block 204). In this manner, a pixel group 66 may be reconstructed to determine uncompressed image data 53 corresponding with the pixel group 66.

Returning to the process 164 of FIG. 21, the processing pipeline 36 may successively process pixel groups 66 until each pixel group 66 in the target pixel tile 64 has been processed (decision block 174). Generally, each pixel group 66 in a pixel tile 64 may be processed in a similar manner. After processing each pixel group 66, the processing pipeline 36 may determine uncompressed image data 53 corresponding with the target pixel tile 64 (process block 84). As described above, the processing pipeline 36 may include one or more image data processing blocks 54 that process uncompressed image data 53. Thus, uncompressed image data 53 corresponding with the target pixel tile 64 may be output to one or more image data processing blocks 54 in the processing pipeline 36. As described above, to facilitate improving communication efficiency and/or storage efficiency, processed image data returned from the one or more image data processing blocks 54 may be compressed, for example, by the compression engine 46 before storage in external memory 38.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising a first image data processing pipeline, wherein the first image data processing pipeline comprises:
   first image data processing circuitry configured to output first uncompressed image data corresponding to a first pixel tile in an image to be displayed on an electronic display, wherein the first pixel tile comprises a first pixel group and a second pixel group; and
   a compression engine coupled to the first image data processing circuitry, wherein the compression engine comprises:
      a prediction block configured to determine a first plurality of prediction residuals based at least in part on difference between the first uncompressed image data and a first prediction of the first pixel group and, subsequently, determine a second plurality of prediction residuals based at least in part on difference between the first uncompressed image data and a second prediction of the second pixel group;
      a run encode block coupled to the prediction block, wherein the run encode block is configured to replace a first prediction residual in the first plurality of prediction residuals with a first escape value and replace a second prediction residual in the first plurality of prediction residuals with a first run length value when a first run of prediction residuals starting in the first pixel group and continuing into the second pixel group is detected; and
      an entropy encode block coupled to the run encode block, wherein the entropy encode block is configured to generate first compressed image data corresponding with the first pixel tile by entropy encoding a third prediction residual in the first plurality of prediction residuals, the first escape value, and the first run length value when the first run is detected.

2. The electronic device of claim 1, comprising a second image data processing pipeline, wherein the second image data processing pipeline comprises:
   second image data processing circuitry configured process the first uncompressed image data; and
   a decompression engine coupled to the second image data processing circuitry, wherein the decompression engine comprises:
      an entropy decode block configured to determine the third prediction residual, the first escape value, and the first run length value by entropy decoding the first compressed image data;
      a run decode block coupled to the entropy decode block, wherein the run decode block is configured to determine each of the first plurality of prediction residuals and each of the second plurality of predication residuals based at least in part on the third prediction residual, the first escape value, and the first run length value; and
      a reconstruction block coupled to the run decode block, wherein the reconstruction block is configured to determine the first uncompressed image data by applying each of the first plurality of prediction residuals to the first prediction of the first pixel group and applying each of the second plurality of prediction residuals to the second prediction of the second pixel group.

3. The electronic device of claim 2, comprising a memory device coupled to the first image data processing pipeline and the second image data processing pipeline, wherein:

the memory device is external from the first image data processing pipeline and the second image data processing pipeline;

the first image data processing pipeline comprises a first direct memory access block configured to store the first compressed image data in the memory device; and the second image data processing pipeline comprises a second direct memory access block configured to retrieve the first compressed image data from the memory device.

4. The electronic device of claim 1, wherein:

the first image data processing circuitry is configured generate the first uncompressed image data by processing second uncompressed image data corresponding with the first pixel tile to facilitate improving perceived image quality when the image is displayed on the electronic display; and the first image data processing pipeline comprises a decompression engine coupled to the first image data processing circuitry, wherein the decompression engine comprises:

an entropy decode block configured to determine a fourth prediction residual, a second escape value, and a second run length value by entropy decoding second compressed image data corresponding with the first pixel tile;

a run decode block coupled to the entropy decode block, wherein the run decode block is configured to determine a third plurality of prediction residuals corresponding with the first pixel group and a fourth plurality of prediction residuals corresponding with the second pixel group based at least in part on the fourth prediction residual, the second escape value, and the second run length value; and a reconstruction block coupled to the run decode block, wherein the reconstruction block is configured to determine the second uncompressed image data by applying each of the third plurality of prediction residuals to a third prediction of the first pixel group and each of the fourth plurality of prediction residuals to a fourth prediction of the second pixel group.

5. The electronic device of claim 1, wherein:

the first image data processing circuitry configured to output second uncompressed image data corresponding to a second pixel tile in the image, wherein the second pixel tile comprises a third pixel group and a fourth pixel group;

the prediction block is configured to determine a third plurality of prediction residuals based at least in part on difference between the second uncompressed image data and a third prediction of the third pixel group and, subsequently, determine a fourth plurality of prediction residuals based at least in part on difference between the second uncompressed image data and a fourth prediction of the fourth pixel group;

the run encode block is configured to pass each of the third plurality of prediction residuals to the entropy encode block when a second run of prediction residuals starting in the third pixel group and continuing into the fourth pixel group is not detected; and the entropy encode block is configured to generate second compressed image data corresponding with the second pixel tile by entropy encoding the third plurality of prediction residuals when the second run is not detected.

6. The electronic device of claim 1, wherein, when the first run is not detected:

the run encode block is configured to pass each of the first plurality of prediction residuals to the entropy encode block; and the entropy encode block is configured to generate the first compressed image data by entropy encoding each of the first plurality of prediction residuals.

7. The electronic device of claim 1, wherein the prediction block configured to:

determine the first prediction of the first pixel group based at least in part on neighboring uncompressed image data without considering the first uncompressed image data;

determine each of the first plurality of prediction residuals in a 2's complement notation; and covert each of the first plurality of prediction residuals from the 2's complement notation to a signed-magnitude notation by doubling absolute value and adding value of a corresponding sign bit in the 2's complement notation.

8. The electronic device of claim 1, wherein the prediction block is configured to:

determine each of the first plurality of prediction residuals during a first clock cycle; and determine each of the second plurality of prediction residuals during a second clock cycle directly after the first clock cycle.

9. The electronic device of claim 1, wherein the run encode block is configured to detect the first run when the first prediction residual in the first plurality of prediction residuals, the second prediction residual in the first plurality of prediction residuals, and each of the second plurality of prediction residuals are zero.

10. The electronic device of claim 1, wherein the run encode block is configured to, when the first run is detected:

replace the first prediction residual in the first plurality of prediction residuals with the first escape value to indicate a starting pixel position of the first run; and replace the second prediction residual in the first plurality of prediction residuals with the first run length value to indicate number of pixel position the first run spans, wherein the second prediction residual corresponds to a pixel position directly after the starting pixel position.

11. The electronic device of claim 1, wherein, to generate the first compressed image data, the entropy encode block is configured to:

determine a first most-significant non-zero bit position used to indicate the third prediction residual in the first plurality of prediction residuals in binary;

determine a second most-significant non-zero bit position used to indicate a fourth prediction residual in the first plurality of predication residuals in binary;

when the first run is detected:

determine a third most-significant non-zero bit position used to indicate the first escape value in binary;

determine a fourth most-significant non-zero bit position used to indicate the first run length value in binary;

truncate and concatenate each of the first escape value, the first run length value, the third prediction residual, and the fourth prediction residual based at least in part on a first highest most-significant non-zero bit position from among the first most-significant non-zero bit position, the second most-significant non-zero bit position, the third most-significant non-zero bit position, and the fourth most-significant non-zero bit position to generate a variable length code in the first compressed image data; and indicate the first highest most-significant non-zero bit position in a fixed length code in the first compressed image data; and when the first run is not detected:
determine a fifth most-significant non-zero bit position used to indicate the first prediction residual in the first plurality of prediction residuals in binary;

determine a sixth most-significant non-zero bit position used to indicate the second prediction residual in the first plurality of prediction residuals in binary;

truncate and concatenate each of the first plurality of prediction residuals based at least in part on a second highest most-significant non-zero bit position from among the first most-significant non-zero bit position, the second most-significant non-zero bit position, the fifth most-significant non-zero bit position, and the sixth most-significant non-zero bit position to generate the variable length code in the first compressed image data; and indicate the second highest most-significant non-zero bit position in the fixed length code in the first compressed image data.

12. The electronic device of claim 1, wherein the electronic device comprises a portable phone, a media player, a personal data organizer, a handheld game platform, a tablet device, a computer, or any combination thereof.

13. A method for processing image data to be used to display an image on an electronic display, comprising:

retrieving, using direct memory access circuitry, first compressed image data corresponding to a pixel tile in the image from a memory device communicatively coupled to the direct memory access circuitry via a direct memory access channel, wherein the pixel tile comprises a first pixel group and a second pixel group; and when a first run starts in the first pixel group and continues into the second pixel group:

entropy decoding, using the direct memory access circuitry, the first compressed image data to determine a first prediction residual indicative of difference between a first prediction of the pixel tile and first uncompressed image corresponding with the pixel tile, a first escape value indicative of staring pixel position of the first run, and a first run length value indicative of number of pixel positions included in the first run;

run decoding, using the direct memory access circuitry, based at least in part on the first escape value and the first run length value to determine a second prediction residuals indicative of difference between a second prediction of the second pixel group and the first uncompressed image data; and reconstructing, using the direct memory access circuitry, the first uncompressed image data by applying the first prediction residual to the first prediction of the first pixel group and applying the second prediction residual to the second prediction of the second pixel group to facilitate subsequent processing of the first uncompressed image data before used to display the image on the electronic display.

14. The method of claim 13, comprising:

receiving, using the direct memory access circuitry, second uncompressed image data corresponding with the pixel tile from image data processing circuitry;

determining, using the direct memory access circuitry, a first plurality of prediction residuals based at least in part on difference between a third prediction of the first pixel group and the second uncompressed image data and, subsequently, a second plurality of prediction residuals based at least in part on difference between the second uncompressed image data and a second prediction of the second pixel group; and when a second run starting in the first pixel group and continuing into the second pixel group is detected:

run encoding, using the direct memory access circuitry, by replacing a third prediction residual in the first plurality of prediction residuals with a second escape value and replace a fourth prediction residual in the first plurality of prediction residuals with a second run length value;

entropy encoding, using the direct memory access circuitry, a fifth prediction residual in the first plurality of predication residuals, the second escape value, and the second run length value to determine second compressed image data corresponding with the pixel tile; and storing, using the direct memory access circuitry, the second compressed image data in the memory device to enable subsequent retrieval.

15. The method of claim 13, wherein:

the first compressed image data corresponding to the first pixel group in the pixel tile comprises a fixed length code and a variable length code; and entropy decoding the first compressed image data when the first run starts in the first pixel group and continues into the second pixel group comprises:

determining a fixed length code from the first compressed image data indicative of number of bits used to indicate each of a first value corresponding with the first prediction residual, a second value corresponding with the first escape value, and a third value corresponding the first run length value in a variable length code of the first compressed image data; and determining the first prediction residual by zero-padding each of the first value based at least in part on the fixed length code.

16. The method of claim 13, wherein run decoding when the first run starts in the first pixel group and continues into the second pixel group comprises:

replacing the first escape value with a third prediction residual indicative of difference between the first prediction of the pixel tile and the first uncompressed image data, wherein the third prediction residual is equal to the second prediction residual; and replacing the first run length value with a fourth prediction residual indicative of difference between the first prediction of the pixel tile and the first uncompressed image data, wherein the fourth prediction residual is equal to the second prediction residual.

17. The method of claim 13, wherein reconstructing the first uncompressed image data comprises:

when the first prediction residual is odd in a signed-magnitude notation:

determining a magnitude of the first prediction residual by dividing the first prediction residual in the signed-magnitude notation by two and subtracting one; and subtracting the magnitude of the first prediction residual from the first prediction of the first pixel group; and when the first prediction residual is not odd in the signed-magnitude notation:

determining the magnitude of the first prediction residual by dividing the first prediction residual in the signed-magnitude notation by two; and adding the magnitude of the first prediction residual to the first prediction of the first pixel group.

18. The method of claim 13, comprising, when the first run does not start in the first pixel group and continue into the second pixel group:

entropy decoding, using the direct memory access circuitry, the first compressed image data to determine a plurality of prediction residuals indicative of difference between the first prediction of the pixel tile and the first uncompressed image corresponding with the pixel tile; and reconstructing, using the direct memory access circuitry, the first uncompressed image data by applying each of the plurality of prediction residuals to the first prediction of the first pixel group.

19. A tangible, non-transitory, computer-readable medium storing instructions executable by one or more processors of an electronic device, wherein the instructions comprise instructions to:

receive, using the one or more processors, a first indication that a first image data processing pipeline is targeting a first pixel tile in an image; and instruct, using the one or more processors, the first image data processing pipeline to retrieve, from an external memory device communicatively coupled to the first image data processing pipeline via one or more direct memory access channels, first compressed image data corresponding with the first pixel tile and at least a portion of second compressed image data corresponding with a second pixel tile in the image based at least in part on a first frame coordinate indicative of location of the first pixel tile in the image and a first size parameter indicative of number of bits used to indicate the first compressed image data when:

the first image data processing pipeline is expected to target the second pixel tile after targeting the first pixel tile; and communication bandwidth of the one or more direct memory access channels is greater than the first size parameter.

20. The computer-readable medium of claim 19, wherein the instructions comprise instructions to:

receive, using the one or more processors, a second indication that the second compressed image data is to be stored in the external memory device, wherein the second compressed image data is generated by a second image data processing pipeline communicatively coupled to the external memory device via the one or more direct memory access channels; and instruct, using the one or more processors, the second image data processing pipeline to store a second size parameter indicative of number of bits used to indicate the second compressed image data at first memory addresses in the external memory device determined based at least in part on a second frame coordinate indicative of location of the second pixel tile in the image; and instruct, using the one or more processors, the second image data processing pipeline to store the second compressed image data at second memory addresses in the external memory device determined based at least in part on expected processing order of pixel tiles in the image.

* * * * *